United States Patent [19]
Maeda

[11] Patent Number: 5,812,320
[45] Date of Patent: Sep. 22, 1998

[54] OPTICAL ENCODER HAVING HIGH RESOLUTION

[75] Inventor: Hideo Maeda, Yokohama, Japan

[73] Assignee: Ricoh Company, Ltd., Tokyo, Japan

[21] Appl. No.: 754,798

[22] Filed: Nov. 21, 1996

Related U.S. Application Data

[62] Division of Ser. No. 542,377, Oct. 12, 1995, Pat. No. 5,652,426, which is a continuation of Ser. No. 229,408, Apr. 18, 1994, abandoned.

[30] Foreign Application Priority Data

Apr. 19, 1993 [JP] Japan .................................. 5-115300
Dec. 31, 1993 [JP] Japan .................................. 5-353764
Mar. 4, 1994 [JP] Japan .................................. 6-060097

[51] Int. Cl.$^6$ .............................. G02B 5/18; G01B 11/02
[52] U.S. Cl. ...................... 359/569; 250/237 G; 356/356
[58] Field of Search .................................. 359/565, 566, 359/569, 572, 575; 250/237 G; 356/356

[56] References Cited

U.S. PATENT DOCUMENTS

| | | | |
|---|---|---|---|
| 4,200,395 | 4/1980 | Smith et al. | 356/356 |
| 4,970,388 | 11/1990 | Nishimura et al. | 250/237 G |
| 5,009,506 | 4/1991 | Spies | 250/237 G |
| 5,104,225 | 4/1992 | Masreliez | 350/237 G |
| 5,120,132 | 6/1992 | Spies et al. | 350/237 G |
| 5,214,280 | 5/1993 | Rieder et al. | 250/237 G |
| 5,260,568 | 11/1993 | Ieki | 250/237 G |
| 5,430,546 | 7/1995 | Huber | 250/237 G |

*Primary Examiner*—Jon W. Henry
*Attorney, Agent, or Firm*—Oblon, Spivak, McClelland, Maier & Neustadt, P.C.

[57] ABSTRACT

An optical encoder is provided which is not affected by fluctuation of wavelength of a light beam due to temperature change, without sacrificing resolution of measurement. The optical encoder comprises a light source emitting a light beam, a first grating to which the light beam emitted by the light source is directed, and a second grating to which light beams exiting from the first grating is directed. Additionally, displacement information obtaining means is provided for obtaining information for the displacement of one of the first and second gratings, the information being obtained according to a twice-diffracted beam and a twice-transmitted beam at the second grating. The twice-diffracted beam is generated from a diffraction beam generated at the first grating, and the twice-transmitted beam is a transmission beam which has been transmitted through the first grating.

15 Claims, 40 Drawing Sheets

FIG. I PRIOR ART

F I G. 7
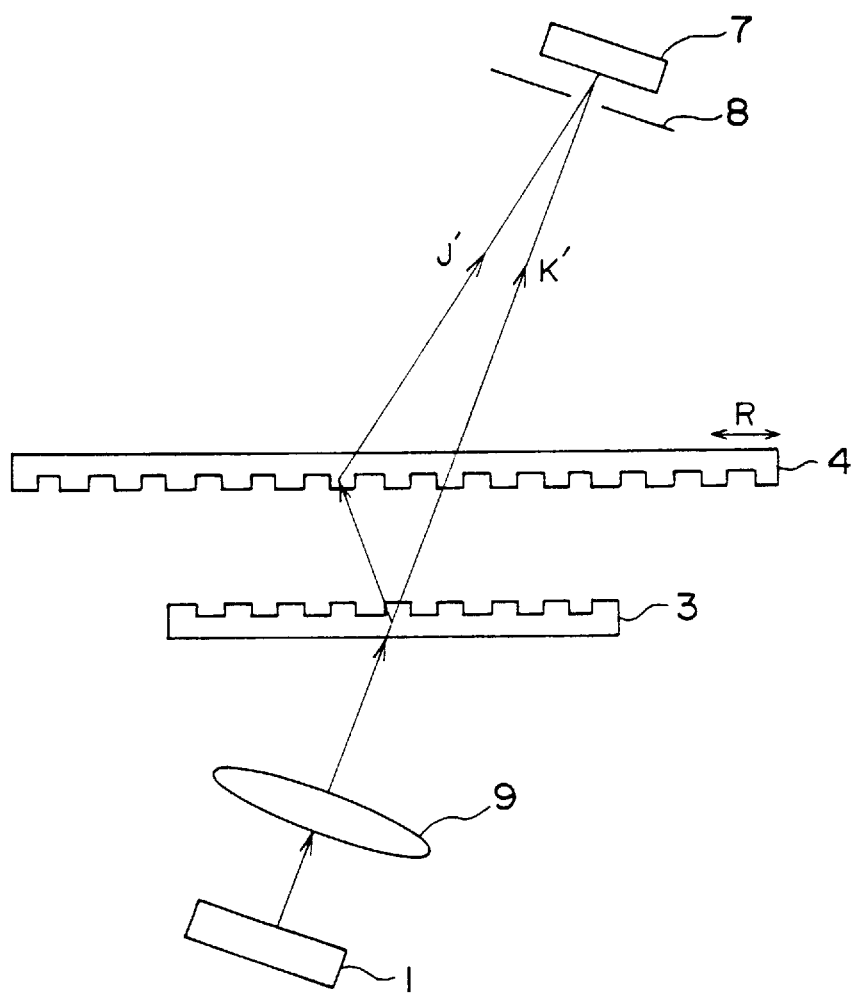

F I G. 10
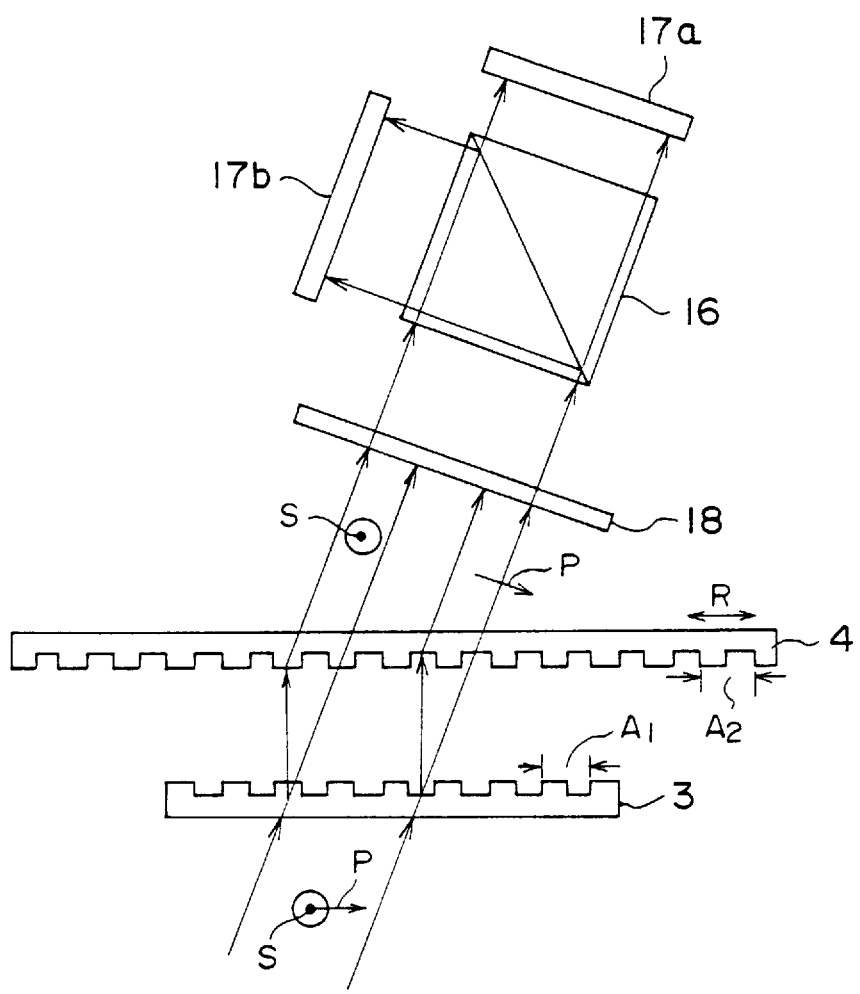

F I G. 16
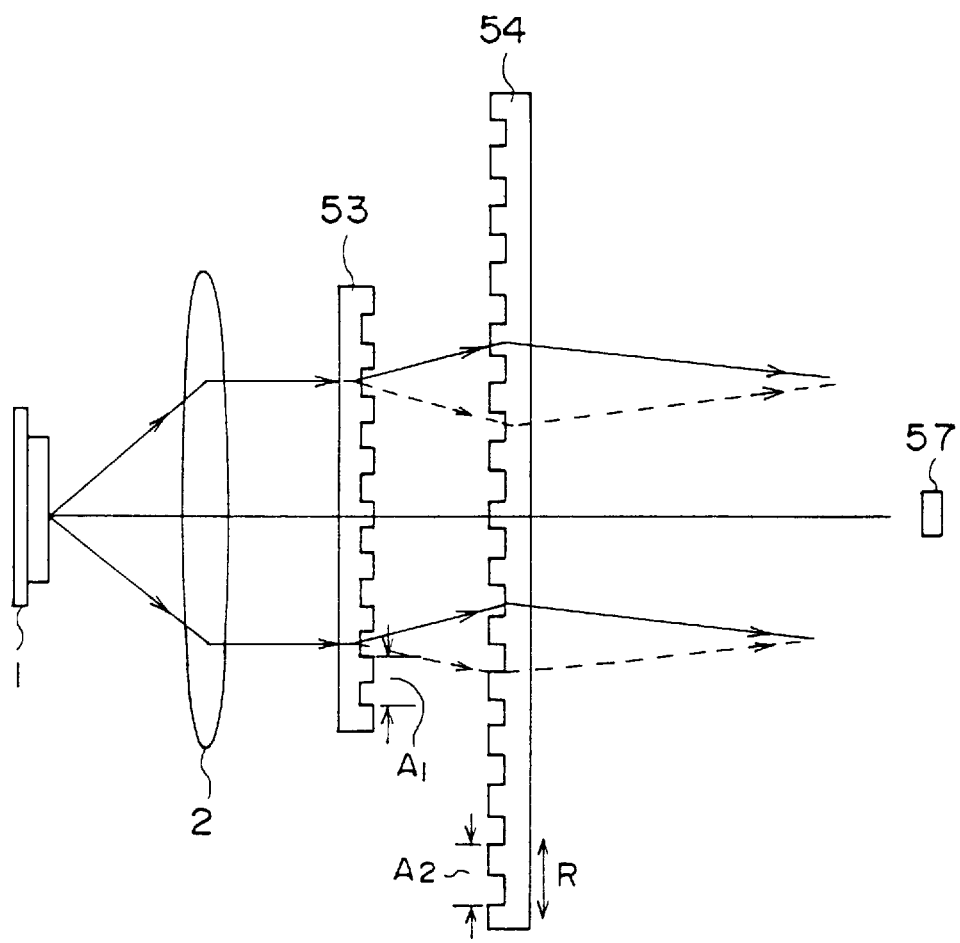

F I G. 24
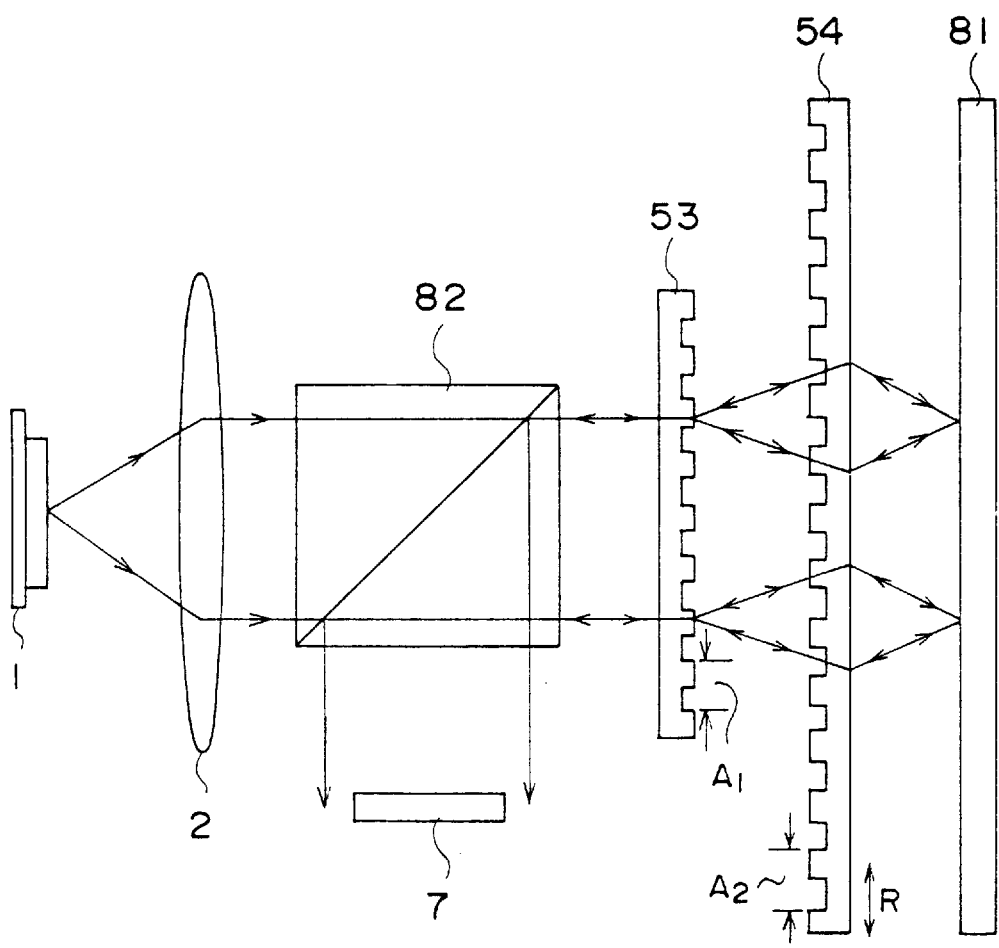

F I G. 26A
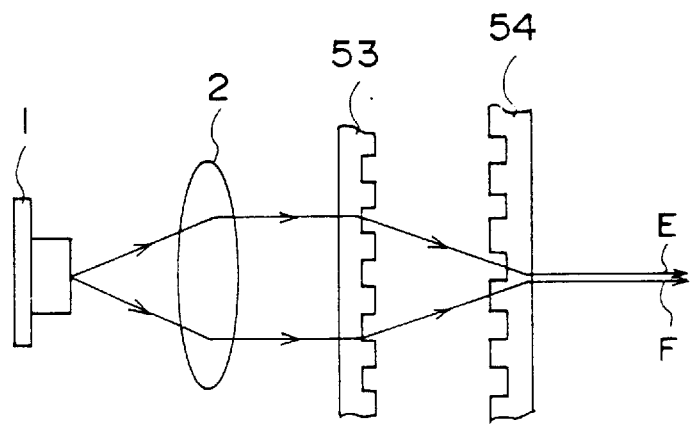
F I G. 26B
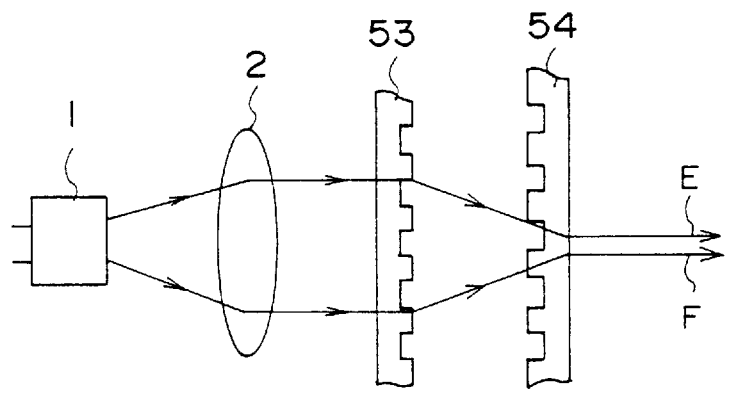

F I G. 35
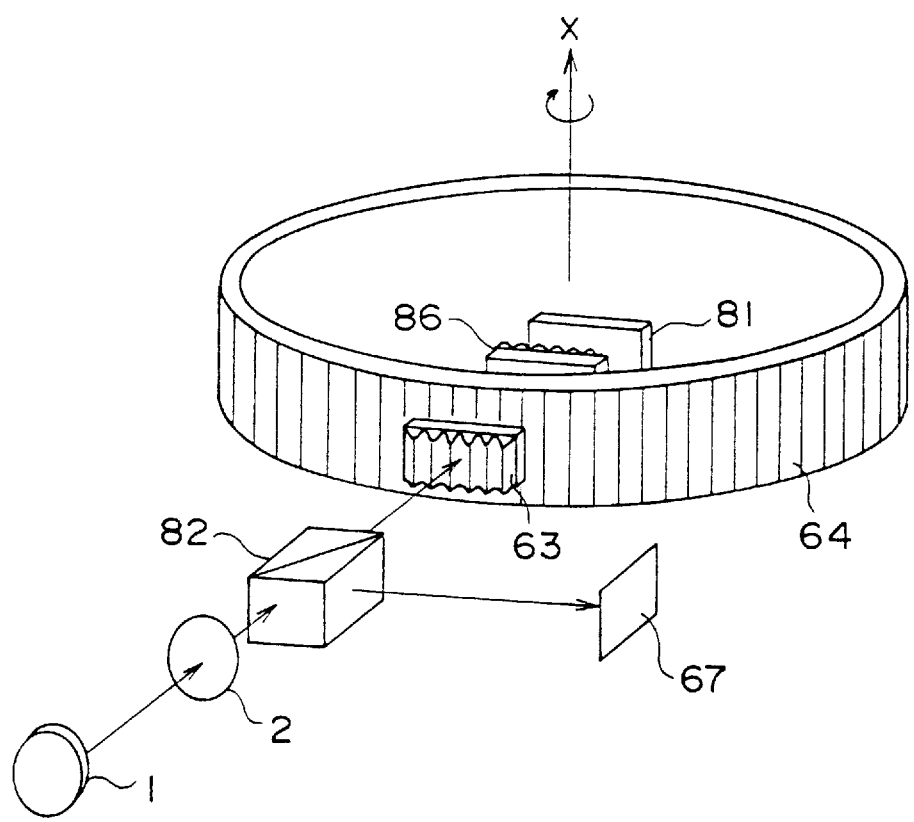

F I G. 38
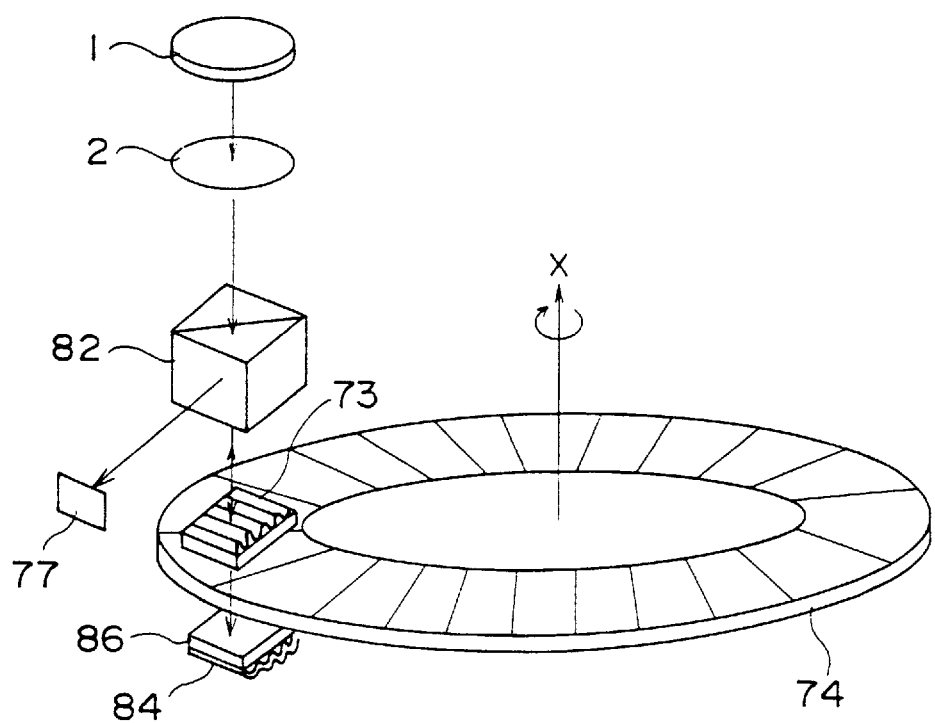

F I G. 45
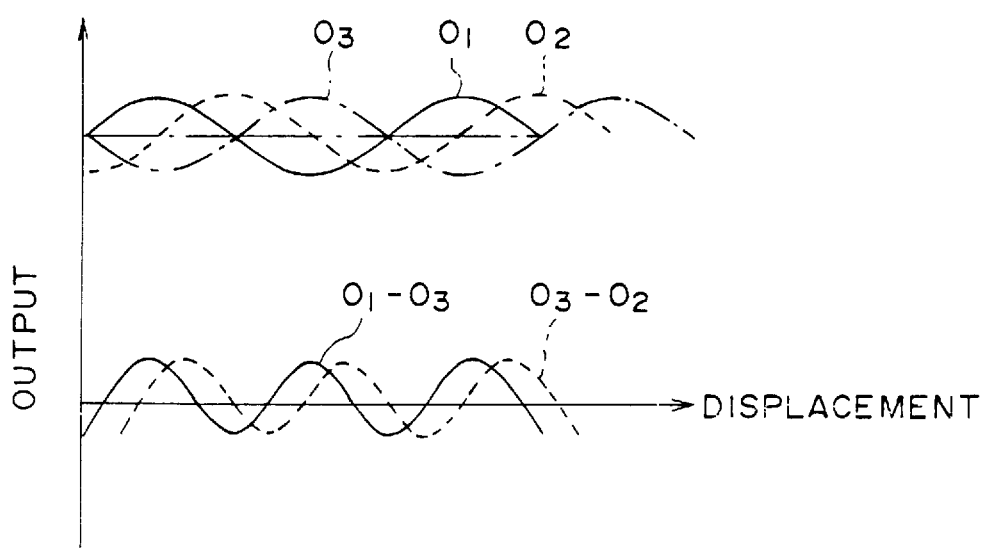

OPTICAL ENCODER HAVING HIGH RESOLUTION

This is Division, of application Ser. No. 08/542,377 filed on Oct. 12, 1995, now U.S. Pat. No. 5,652,426 which is a Continuation of application Ser. No. 08/229,408 filed on Apr. 18, 1994 now abandoned.

BACKGROUND OF THE INVENTION

The present invention relates to an optical encoder used for measuring a displacement of a movable member with high resolution.

Such an optical encoder is incorporated, for example, in a precision measuring apparatus, a drum rotation controlling device and a scanner for a copy machine, an ink-jet printer or the like.

German Laid-Open Patent Application (DE A1) No.2, 316,248 discloses an example of an optical encoder of such a kind. FIG. 1 is an illustration showing a structure of the encoder described in DE A1 2,316,248. The optical encoder comprises light source 101, a lens 102 which collimates a light beam from the light source 101, two diffraction gratings 103 and 104 on which the collimated light beam is incident, a condenser lens 105 and light receiving elements 106, 107 and 107'.

The diffraction grating 103 is fixed, and the diffraction grating 104 is movable. The pitch $A_1$ of the grating 103 is the same as the pitch $A_2$ of the grating 104. Hereinafter, the diffraction grating 103 is referred to as a fixed diffraction grating, and the diffraction grating 104 is referred to as a movable diffraction grating.

In the above-mentioned encoder, a light beam emitted by the light source 101 is collimated by the lens 102 and is incident on the fixed diffraction grating 103 and then the movable diffraction grating 104. The collimated light beam generates at least a first diffraction beam when passing through the gratings 103 and 104. If the pitch $A_1$ and $A_2$ are sufficiently larger than the wavelength of the collimated light beam, higher order diffraction beams may be generated.

FIG. 2 is an illustration for explaining the diffraction beams generated by the gratings 103 and 104. In FIG. 2, for example, the first order diffraction beam generated at the fixed diffraction grating 103 is transmitted through the movable diffraction grating 104, and received by the light receiving element 107 via the lens 105. Additionally, the first order diffraction beam of the light beam transmitted through the fixed diffraction grating 103 without diffraction is generated by the movable diffraction grating 104, and is also received by the light receiving element 107 via the lens 105. As the movable diffraction grating 104 is moved in a direction indicated by an arrow R, the diffraction beams generated by the movable diffraction grating 104 are changed in their phase, while the phase of the original light beam transmitted through the fixed diffraction grating 103 and the movable diffraction grating 104 remains unchanged. That is, for example, the phase of the light beam A is not changed but the phase of the light beam B is changed. This results in phase shift of interference fringes generated by the light beams A and B on the light receiving element 107.

In this encoder, since the pitches $A_1$ and $A_2$ of the two gratings 103 and 104 are equal to each other, diffraction angles of the diffraction beams having the same order at each of the gratings are the same. Accordingly, the light beams A and B are parallel to each other immediately after exiting the grating 104. If the light beams A and B are incident on the light receiving element 107 as is in their parallel relationship, interference fringes generated on the light receiving element 107 have relatively large intervals. The interference fringes having such large intervals are not suitable to use for measuring the displacement of the movable diffraction grating 104 because a sufficient number of interference fringes are not formed on the light receiving element 107.

In order to form interference fringes having a suitable interval, the condenser lens 105 is provided between the movable diffraction grating 104 and the light receiving element 107 so that the distance between the light beams A and B narrows. According to this, as the movable diffraction grating 104 is displaced, the interference fringes are moved on the light receiving element 107, resulting in a sinusoidal change in the amount of light received by the light receiving element 107. Specifically, if the movable diffraction grating 104 moves a small distance corresponding to a single pitch of the grating, the level of output from the light receiving element 107 varies like a single period of sine wave. By sensing this change, the amount of the displacement of the movable diffraction grating 104 can be determined.

In the above-mentioned example, although the description was given using the combination of one of the first diffraction beams generated on one side of the optical axis and the original light beam transmitted through the grating (hereinafter referred to as direct transmission beam), the combination of the other first diffraction beam and the direct transmission beam may be used to form interference fringes on the light receiving element 107' as indicated by C and D in the figure.

As for the light source used for the above-mentioned kind of encoder, a semiconductor laser (LD) is used because of requirements for compactness and a high output. However, there is a problem in that the semiconductor laser has high dependency in its wavelength, that is, the wavelength varies due to temperature changes. Accordingly, due to the temperature change, the diffraction angle at the gratings 103 and 104 is changed, and thus the optical path in the encoder may be changed. This condition may result in that the suitable fringes to generate output of the light receiving element are not formed on the light receiving element. In an extreme case, the diffraction beam is directed beyond the edge of the lens 105. For example, as shown in FIG. 3, when the temperature changes, the light beams A and B may be directed to paths indicated by A' and B', respectively. In order to avoid the effect of temperature change, the diffraction angle may be minimized by increasing the pitches $A_1$ and $A_2$. In such a case, however, resolution of the encoder may be decreased.

SUMMARY OF THE INVENTION

It is a general object of the present invention to provide an improved and useful optical encoder in which the above-mentioned disadvantages are eliminated.

A more specific object of the present invention is to provide an optical encoder which is not affected by fluctuation of wavelength of a light beam due to temperature change, without sacrificing resolution of measurement.

Another object of the present invention is to provide an optical encoder in which interference fringes having a predetermined pitch can be formed without using a condenser lens.

Another object of the present invention is to provide an optical encoder having gratings which can be easily manufactured.

Another object of the present invention is to provide an optical encoder in which a light source having a wide light emitting surface can be used.

In order to achieve the above-mentioned objects, there is provided according to the present invention, an optical encoder comprising:

a light source emitting a light beam;

a first grating to which the light beam emitted by the light source is directed;

a second grating to which light beams exiting from the first grating are directed; and displacement information obtaining means for obtaining information on a displacement of one of the first and second gratings, the information being obtained according to a twice-diffracted beam and a twice-transmitted beam at the second grating, the twice-diffracted beam being generated from a diffraction beam generated at the first grating, the twice-transmitted beam being a transmission beam which has been transmitted through the first grating.

There is provided according to the present invention an optical encoder comprising:

a light source emitting a light beam;

a first grating to which the light beam emitted by the light source is directed, a first and a second nth order diffraction beams being generated at the first grating, where n is an integer, the first nth order diffraction beam being directed to the opposite side, relative to the second nth order diffraction beam, of the light beam emitted by the light source;

a second grating to which the first and second nth order diffraction beams exiting from the first grating are directed, a first and a second mth order diffraction beams being generated from the first and second nth order diffraction beams at the second grating, where m is an integer, the first mth order diffraction beams being directed to the opposite side, relative to the second nth order diffraction beam, of the optical axis of the respective first and second nth order diffraction beams, the second grating having a pitch slightly different from a pitch of the first grating; and displacement information obtaining means for obtaining information on a displacement of one of the first and second gratings, the information being obtained according to a movement of interference fringes formed by the first and second mth order diffraction beams exiting from the second grating.

There is provided according to the present invention an optical encoder comprising:

a light source emitting a light beam;

a first grating to which the light beam emitted by the light source is directed, an $n_1$th order and an $n_2$th order diffraction beams being generated at the first grating, where $n_1$ and $n_2$ are integers, the $n_1$th order diffraction beam being directed to the opposite side, relative to the $n_2$th order diffraction beam, of the optical axis of the light beam emitted by the light source;

a second grating to which the $n_1$th order and the $n_2$th order diffraction beams exiting from the first grating are directed, an $m_1$th order and an $m_2$th order diffraction beams being generated from the $n_1$th order and the $n_2$th order diffraction beams at the second grating, where $m_1$ and $m_2$ are integers; and displacement information obtaining means for obtaining information on a displacement of one of the first and second gratings, the information being obtained according to a movement of interference fringes formed by the $m_1$th order and the $m_2$th order diffraction beams exiting from the second grating.

According to another aspect of the present invention, there is provided an optical encoder obtaining information regarding a movable grating incorporated therein in accordance with a movement of interference fringes caused by a displacement of the movable grating, the optical encoder comprises:

two light-receiving elements apart a distance corresponding to one half of a pitch of the interference fringes, the two light-receiving elements output signals having phases 180 degree different from each other; and means for obtaining displacement information of the movable grating in accordance with a difference between the signals.

The light receiving elements may be apart a distance corresponding to one quarter of the pitch of the interference fringes.

Other objects, features and advantages of the present invention will become more apparent from the following detailed description when read in conjunction with the accompanying drawings.

BRIEF DESCRIPTION OF THE DRAWINGS

FIG. 7 is an illustration of a variation of the first embodiment shown in FIG. 4;

FIG. 10 is an illustration showing another example of the encoder shown in FIG. 8;

FIG. 16 is an illustration of a second embodiment of an encoder according to the present invention;

FIG. 24 is an illustration of a third embodiment of an encoder according to the present invention;

FIG. 26A is an illustration for explaining a point light source;

FIG. 26B is an illustration for explaining a light emitting diode having a relatively wide light emitting surface;

FIG. 35 is an illustration of a rotary encoder according to the present invention;

FIG. 38 is an illustration of a rotary encoder according to the present invention;

FIG. 45 is a graph showing output signals from the light receiving elements shown in FIG. 44;

DETAILED DESCRIPTION OF THE PREFERRED EMBODIMENT

Figure 1:
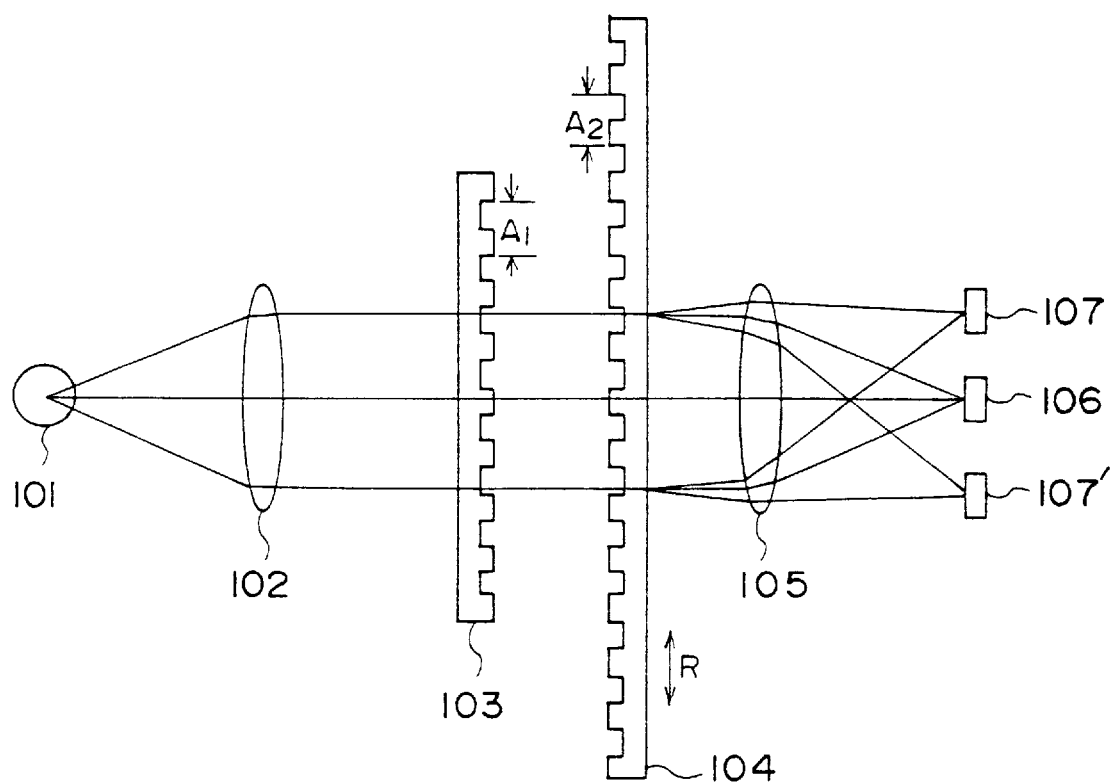
FIG. 1 is an illustration showing a structure of a conventional encoder.
Figure 2:
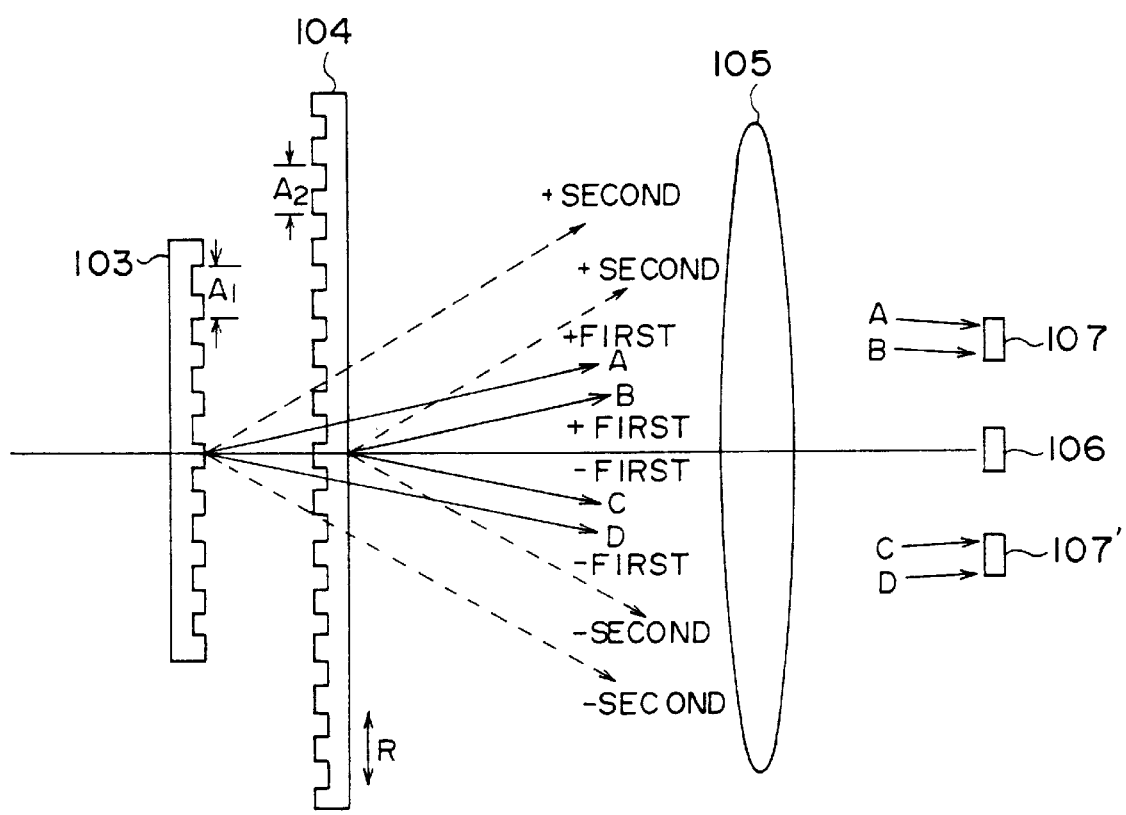
FIG. 2 is an illustration for explaining diffraction beams generated by two gratings in the encoder shown in FIG. 1.
Figure 3:
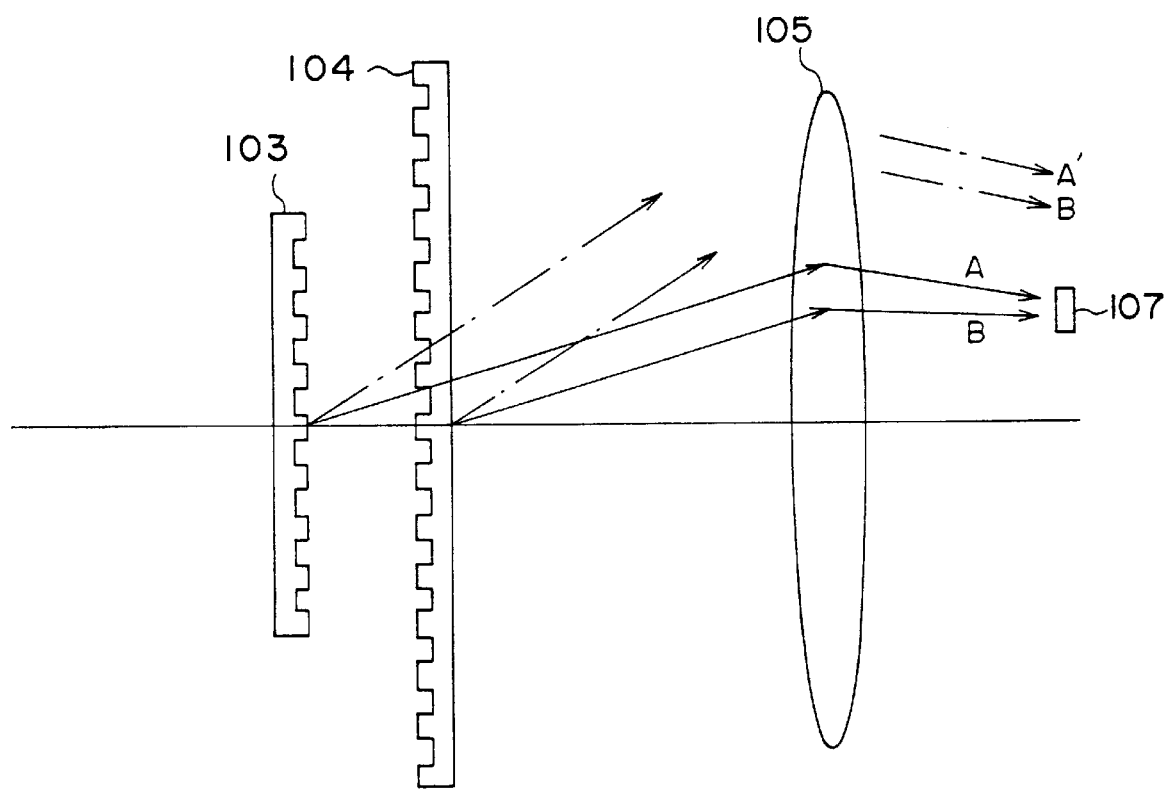
FIG. 3 is an illustration for explaining diffraction beams generated by two gratings in the encoder shown in FIG. 1.
Figure 4:
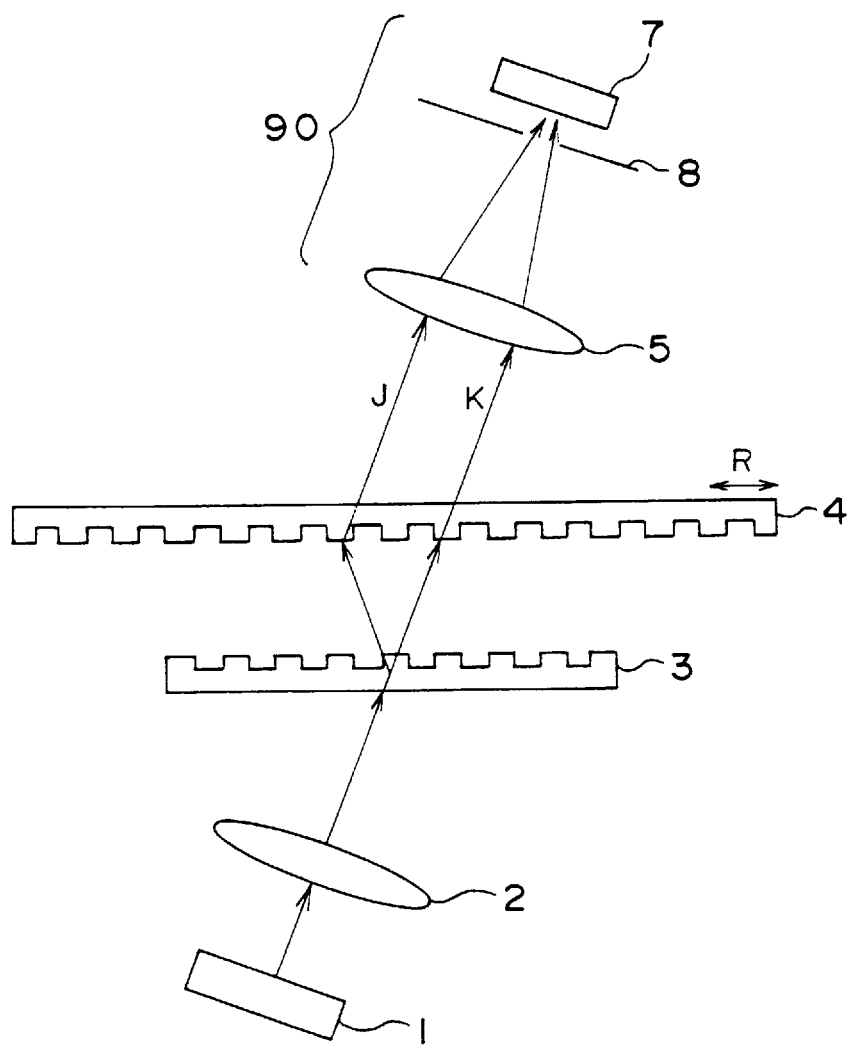
FIG. 4 is an illustration showing the first embodiment of an optical encoder according to the present invention.

A description will now be given, with reference to FIG. 4, of a first embodiment of an optical encoder according to the present invention. FIG. 4 is an illustration showing the first embodiment of an optical encoder according to the present invention.

The optical encoder shown in FIG. 4 comprises a light source 1, a lens 2 which collimates a light beam emitted by the light source 1, two diffraction gratings 3 and 4 on which the collimated light beam is incident and displacement information obtaining means 90.

A semiconductor laser or an LED is used as the light source 1. The pitch $A_1$ of the diffraction grating 3 is equal to the pitch $A_2$ of the diffraction grating 4. The grating surface of the diffraction grating 3 is parallel to the grating surface of the diffraction grating 4. The diffraction grating 3 is fixed, and the diffraction grating 4 is movable in a direction indicated by an arrow R. Hereinafter, the grating 3 is referred to as a fixed diffraction grating, and the grating 4 is referred to as a movable diffraction grating.

Figure 5:
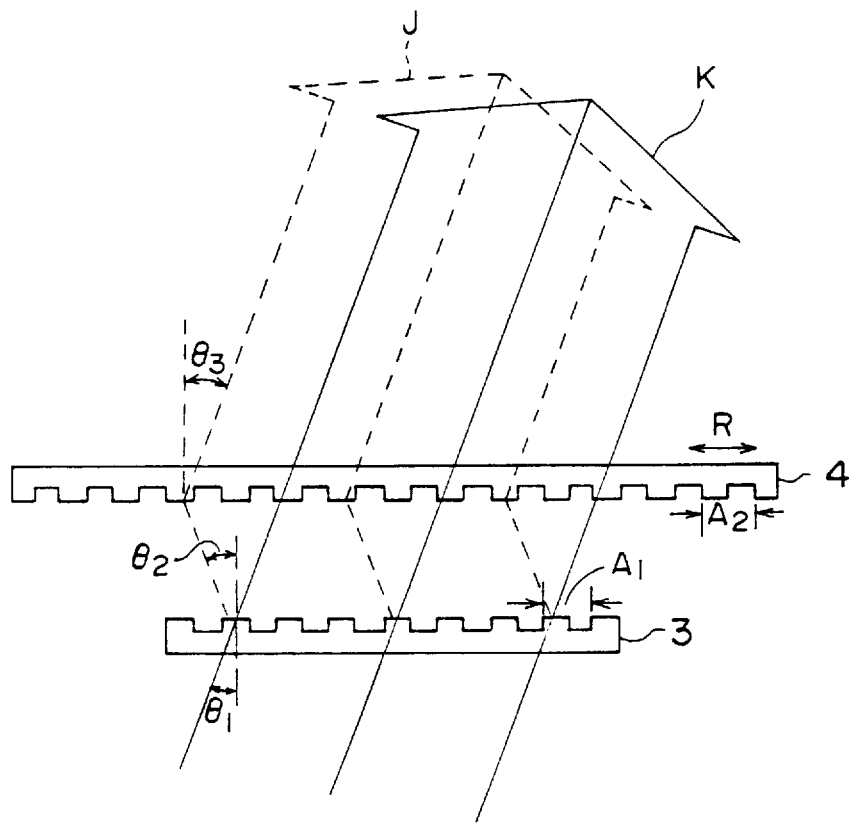
FIG. 5 is an illustration for explaining a diffraction beam and a transmission beam at the two gratings shown in FIG. 4.

In the first embodiment, as shown in FIG. 5, in order to generate interference fringes, a diffraction beam J (twice-diffracted beam) is diffracted by both the fixed diffraction grating 3 and movable diffraction grating 4 and a light beam (twice-transmitted beam) K is transmitted directly through both the fixed diffraction grating 3 and movable diffraction grating 4. That is, displacement information of the movable diffraction grating 4 is obtained in accordance with the twice diffraction beam J and the twice transmission beam K. In the first embodiment, the displacement information obtaining means 90 comprises a condenser lens 5 and a single light receiving element 7.

A description will now be given of a principle of an operation of the first embodiment.

Conditions of diffraction at the fixed diffraction grating 3 and movable diffraction grating 4 are given by the following expressions.

$$\sin\theta_1 + \sin\theta_2 = n\lambda/A_1 \quad (1a)$$

$$\sin\theta_2 + \sin\theta_3 = m\lambda/A_2 \quad (1b)$$

Where $\theta_1$ is an incident angle at the fixed diffraction grating 3;

$\theta_2$ is the diffraction angle at the fixed diffraction grating 3;

$A_1$ is the pitch of the fixed diffraction grating 3;

n is the order of diffraction at the fixed diffraction grating 3;

$\theta_3$ is the diffraction angle at the movable diffraction grating 4;

$A_2$ is the pitch of the movable diffraction grating 4;

m is the order of diffraction at the movable diffraction grating 4;

$\lambda$ is the wavelength of the light source 1.

By eliminating $\theta_2$ from the above expressions, the following expression is obtained.

$$\sin \theta_1 - \sin \theta_3 = \lambda(n/A_1 - m/A_2) \quad (2)$$

According to the expression (2), it is understood that when the wavelength $\lambda$ changes, the diffraction angle $\theta_3$ is changed in proportion to $(n/A_1-m/A_2)$. Therefore, in order to obtain a constant diffraction angle $\theta_3$ even if the wave length $\lambda$ is changed, the order of diffraction m and n and the pitches $A_1$ and $A_2$ must satisfy the following relationship.

$$(n/A_1 - m/A_2) = 0 \quad (3)$$

In the above relationship, if the pitch $A_1$ is equal to the pitch $A_2$, the order of diffraction at each of the gratings 3 and 4 should be the same number. That is, n should be equal to m. More specifically, a first diffraction beam of the movable diffraction grating 4 generated from a first diffraction beam of the fixed diffraction grating 3 may be used, for example, as the light beam J as shown in FIG. 4.

As mentioned above, the diffraction angle $\theta_3$ can be constant regardless of changes in the temperature. Additionally, because the diffraction angle $\theta_3$ is then equal to the incident angle $\theta_1$, the twice-diffracted beam J is always parallel to the twice-transmitted beam K. The beams J and K are very stable with respect to the temperature, and this enables decreasing of the pitches $A_1$ and $A_2$ of the fixed diffraction grating 3 and movable diffraction grating 4, resulting in an increase in diffraction efficiency and higher resolution.

Figure 6:
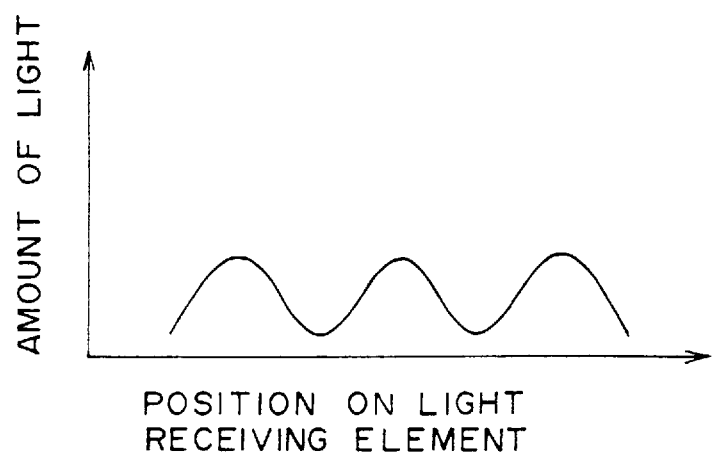
FIG. 6 is a graph showing change in amount of light received by a light receiving element in accordance with interference generated by means of two gratings when one of the gratings is moved.

If the light receiving element 7 has a light receiving surface smaller than the interval of the interference fringes, or if a pin hole 8 having a diameter smaller than the interval of the interference fringes is provided in front of the light receiving element 7, the amount of light received by the light receiving element 7 changes as shown in FIG. 6. Therefore, the displacement of the movable diffraction grating 4 can be sensed by the output from the light receiving element 7 in accordance with the change in amount of light received.

Instead of decreasing the pitches of the gratings, the resolution of the encoder can be increased using a higher order of diffraction. For example, instead of the first diffraction beam, the second order diffraction beam at the movable diffraction grating 4 generated from the second diffraction beam of the fixed diffraction grating 3 may be used in the first embodiment.

The movable diffraction grating 4 needs a length longer than the length of the fixed diffraction grating 3 since the movable diffraction grating 4 is moved. Accordingly, it is difficult to make the movable diffraction grating 4 with a smaller pitch without faults, as compared with the fixed diffraction grating 3. In order to eliminate this problem, a higher order of diffraction may be used with increased pitch of the movable diffraction grating 4. Specifically, the pitch $A_2$ of the movable diffraction grating 4 is formed twice as large as pitch $A_1$ of the fixed diffraction grating 3, and the order of diffraction at the movable diffraction grating 4 is twice as high as the order of diffraction at the fixed diffraction grating 3 so that the relationship (3) is satisfied.

FIG. 7 is an illustration of a variation of the first embodiment. In the first embodiment, the lens 5 is provided for condensing the light beams J and K which are parallel at the exit of the movable diffraction grating 4. The variation shown in FIG. 7 has a lens (condenser lens) 9 instead of the lens 5. The lens 9 is provided between the light source 1 and the fixed diffraction grating 3 so as to collimate the light beam from the light source 1 and to condense two light beams J' and K' exiting from the movable diffraction grating 4.

In FIG. 7, the light beam emitted by the light source 1 is collimated and condensed by the lens 9. The light beam is then incident on the fixed diffraction grating 3 to generate a diffraction beam which is consequently incident on the movable diffraction grating 4. The diffraction beam and the beam transmitted through the fixed diffraction grating 3 exit from the movable diffraction grating 4. At this time, the beams J' and K' are not parallel and are directed so that the two beams converge at the light receiving element 7 due to the condensing effect of the lens 9. In this variation, since only a single lens 9 is required as compared to the first embodiment, the encoder can be miniaturized in size.

It should be noted that the displacement of the movable diffraction grating 4 can be realized utilizing polarization of the light beam using rotation of polarization instead of the interference fringes utilized in the above-mentioned embodiment and variation.

Figure 8:
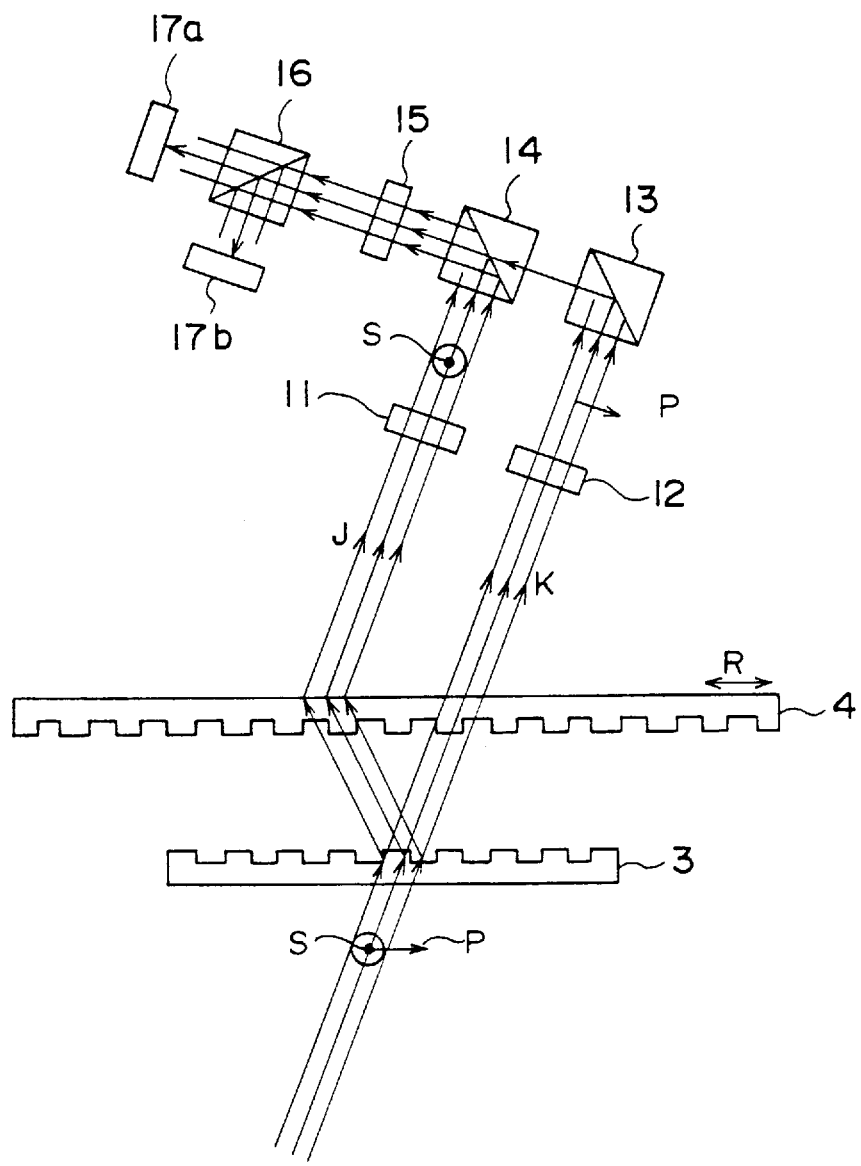
FIG. 8 is an illustration showing a variation of the encoder shown in FIG. 4 in which encoder a rotation of polarization is used.

FIG. 8 is an illustration of an encoder utilizing rotation of a polarized beam. The encoder shown in FIG. 8 comprises polarizing plates 11 and 12, a beam splitter 13, polarization beam splitters 14 and 16, $\lambda/4$ plate 15 and light receiving elements 17a and 17b. In this encoder, the diffraction gratings 3 and 4 have relatively larger pitches compared to the wavelength of the beam, and it is particularly useful when polarization conditions of the beams J and K are the same as the beams incident on the movable diffraction grating 4 or in a slightly elliptically polarized condition.

In the encoder of FIG. 8, the polarizing plate 11 converts the twice transmission beam K exiting from the movable diffraction grating 4 into a linearly polarized beam (for example S-polarization). The beam K is then incident on the polarization beam splitter 14 via the beam splitter 13. The twice diffraction beam J which exits from the movable diffraction grating 4 is converted by the polarization plate 12 into a linearly polarized beam polarized in a direction perpendicular to the polarization direction of the polarizing plate 11. The twice diffraction beam J and the twice transmission beam K are superposed, and incident on the $\lambda/4$ plate 15. The beams J and K are converted into circularly polarized beam having rotations opposite to each other. The beams J and K are then incident on the polarization beam splitter 16. Since the optical system of the encoder is arranged so that optical paths between the fixed diffraction grating 3 and the polarization beam splitter 16 are equal to each other, the superposed beam comprising the beams J and K is incident on the polarization beam splitter 16 as an apparently linearly polarized beam. If the movable diffraction grating 4 moves, the polarization of the twice diffraction beam J is rotated, and accordingly the polarization of the apparently linearly polarized beam is rotated. The polarization beam splitter 16 splits the beam incident on the polarization beam splitter 16 into an S-polarization beam and a P-polarization beam. Each of the S-polarization beam and the P-polarization beam are received by the respective light receiving elements 17a and 17b. Because the ratio of the light intensities of the S-polarization beam and the P-polarization beam is proportional to the rotation of the polarization of the beam incident on the polarization beam splitter 16, the displacement of the movable diffraction grating 4 can be sensed by obtaining the ratio of outputs of the light receiving elements 17a and 17b. The signal obtained in accordance with the ratio of the outputs of the light receiving elements 17a and 17b is a complete sine waveform, and thus an accurate sensing of a displacement of the movable diffraction grating 4 can be realized.

It should be noted that, instead of using the $\lambda/4$ plate 15, a polarizing plate having the polarization axis inclined 45 degrees from the polarization direction of each of the beams J and K may be used so as to obtain the circularly polarized beams to be incident on the polarization beam splitter. In such a case, the manufacturing cost of the encoder can be reduced.

Figure 9:
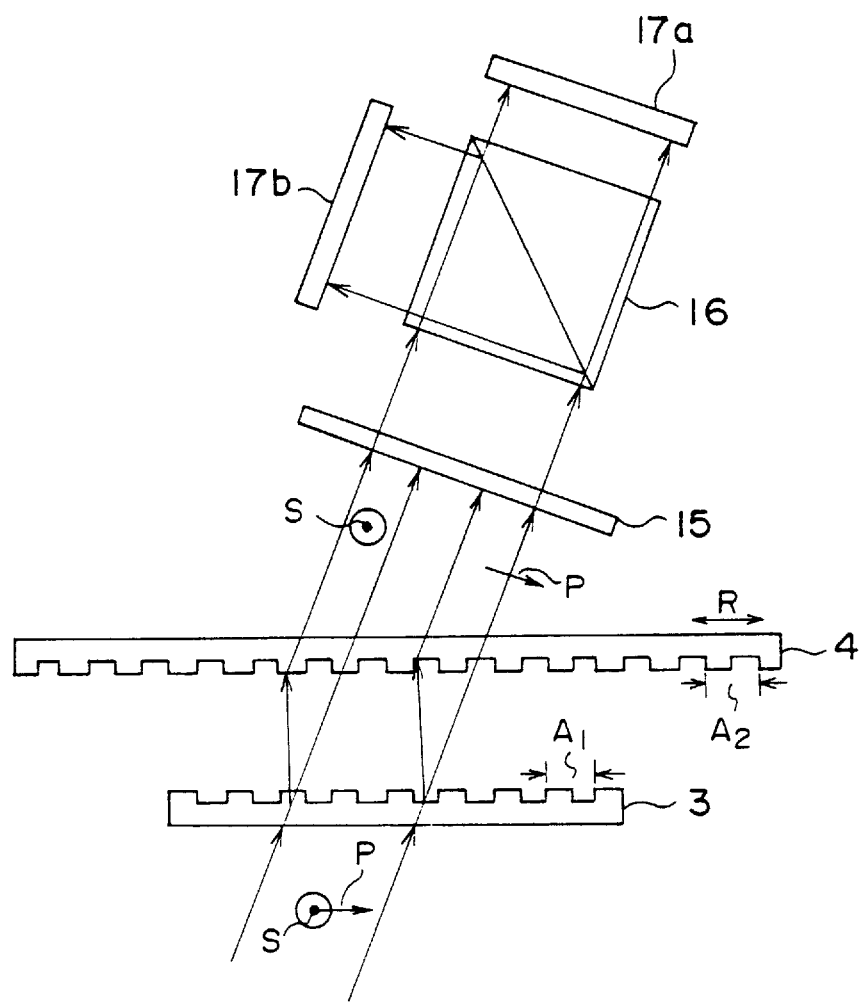
FIG. 9 is an illustration showing another example of the encoder shown in FIG. 8.

FIGS. 9 and 10 show variations of the encoder utilizing rotation of polarization. The encoders shown in FIGS. 9 and 10 are adapted to a case where the pitches $A_1$ and $A_2$ of the gratings 3 and 4 are smaller than the wavelength of the beam emitted by the light source. If the pitches $A_1$ and $A_2$ are smaller than the wavelength of the beam, a dependency on polarization occurs wherein an S-polarization beam is diffracted while a P-polarization beam is transmitted. Accordingly, in the encoder shown in FIGS. 9 and 10, the beam J exiting from the movable diffraction grating 4 is the S-polarization beam and the beam K exiting from the movable diffraction grating 4 is the P-polarization beam. This means that the gratings 3 and 4 themselves have a polarizing function. Accordingly, it is not necessary to provide the polarizing plates 11 and 12, the beam splitter 13 and the polarization beam splitter 14 of the encoder shown in FIG. 8. In the case of FIG. 9, the twice diffraction beam J and the twice transmission beam K are directly incident on the $\lambda/4$ plate 15. In the case of FIG. 10, the beams J and K are directly incident on a polarizing plate 18 which functions the same as the $\lambda/4$ plate 15 as mentioned above.

In the encoder of FIGS. 9 and 10, the number of parts can be reduced, and thus the encoder can be miniaturized.

Figure 11:
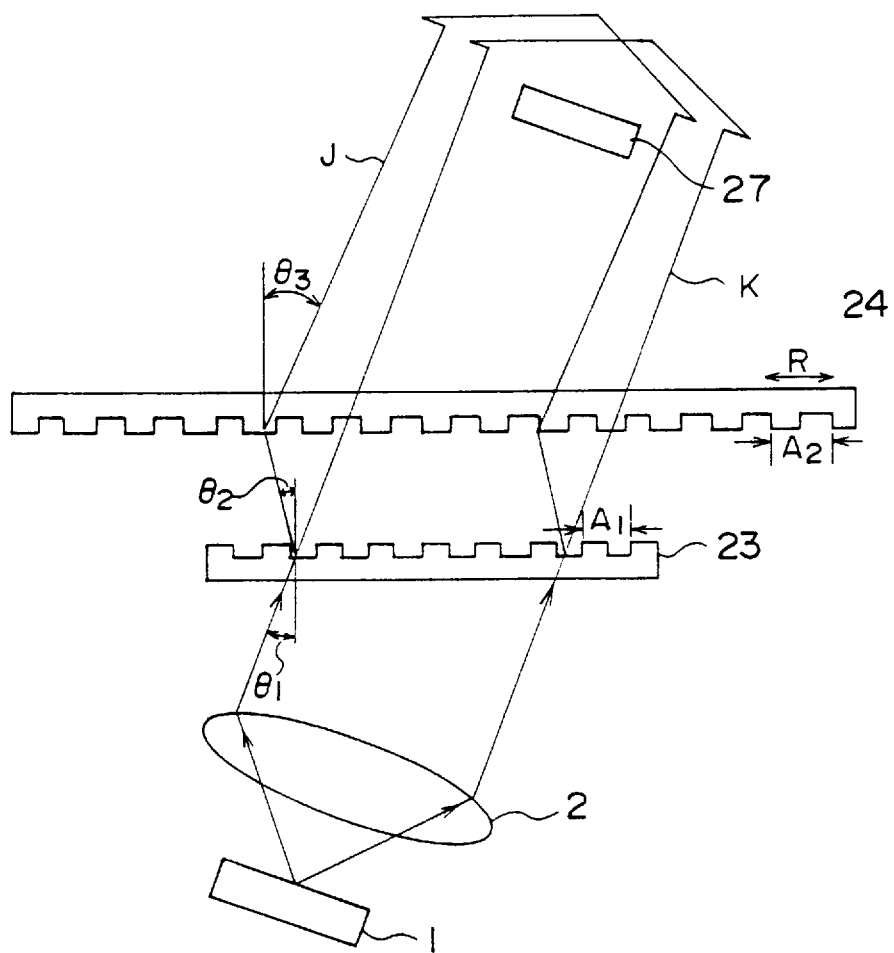
FIG. 11 is another variation of the encoder shown in FIG. 4.
Figure 12:
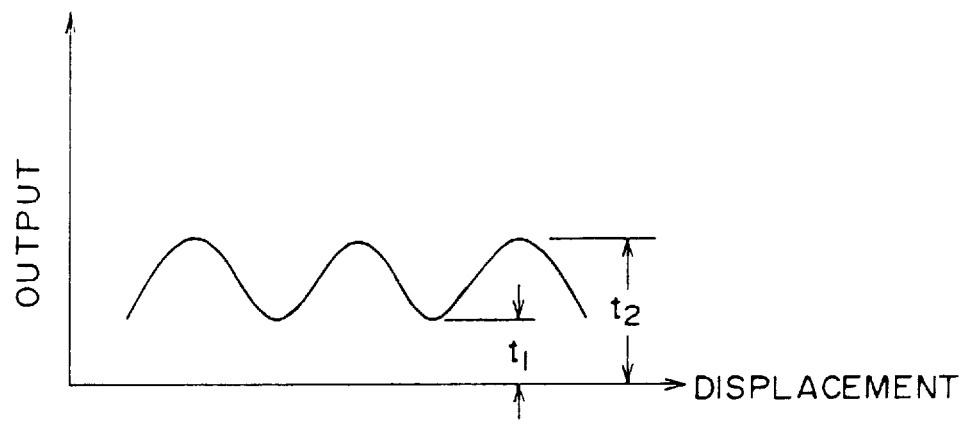
FIG. 12 is a graph showing an output signal from the encoder shown in FIG. 11.

FIG. 11 shows another variation of the first embodiment. In an encoder shown in FIG. 11, similarly to the first embodiment shown in FIG. 4, two diffraction gratings 23 and 24 parallel to each other are provided. The encoder of FIG. 11 is not provided with the condenser lens 5, but instead of that the pitch $A_1$ of the fixed diffraction grating 23 is slightly different from the pitch $A_2$ of the movable diffraction grating 24. By doing so, the beams J and K are made to converge so that the beams J and K can be condensed in one spot.

In the construction of FIG. 11, the above-mentioned expression (2) is also established. An angle de between the beams J and K can be obtained by the following expression.

$$d\theta = \theta_1 - \theta_3 \quad (4)$$

Supposing de is extremely small, the above-mentioned expression (2) can expressed as follows.

$$\sin\Theta_1 - \sin\Theta_3 = \sin\Theta_1 - \sin(\Theta_1 - d\Theta) = \sin\Theta_1 - \sin\Theta_1 * \cos d\Theta + \quad (5)$$

$$\sin d\Theta * \cos\Theta_1 \approx \sin d\Theta * \cos\Theta_1 \approx d\Theta * \cos\Theta_1 = \lambda(n/A_1 - m/A_2)$$

According to the above, even if the order of diffraction at the gratings 23 and 24 is the same, that is m is equal to n, the angle de can be provided between the beams J and K. Additionally, the pitch $A_0$ of the interference fringes formed by the beams J and K is given by the following equation.

$$\sin(d\theta/2) \approx d\theta/2 = \lambda/2A_0 \quad (6)$$

By substituting $d\theta$ of the expression (6) in the expression (5), the following expression is obtained.

$$1/A_0 = (n/A_1 - m/A_2)/\cos\theta_1 \quad (7)$$

According to the expression (7), it is understood that the pitch $A_0$ of the interference fringes is not related to the wavelength of the beam incident on the grating 23. Additionally, by multiplying the right side and the left side of the expression (7) by $W_0 \cos\theta_1$, the following expression is obtained.

$$(W_0/A_0) * \cos\theta_1 = nW_0/A_1 - mW_0/A_2 \quad (8)$$

In the above expression (8), $W_0/A_0$ represents the number of fringes, in the beam spot diameter, formed by interference. $nW_0/A_1$ and $mW_0/A_2$ represent the numbers of lines of gratings 23 and 24, in the beam spot diameter, multiplied by the respective order of diffraction. Accordingly, the following expression can be obtained from the expression (8).

(number of fringes of interference) × cosΘ = (9)

(order of diffraction) × (number of grids of fixed diffraction grating) −

(order of diffraction) × (nubmer of grids of movable diffraction grating)

Accordingly, by setting the pitches $A_1$ and $A_2$ to appropriate values, an arbitrary number of fringes can be obtained. For example, in a condition where the first diffraction beam is used (n=m=1) and =0.78 $\mu$m, $\theta_1$=45°, $A_1$ meets the Bragg condition, $A_1 = \lambda/2 \sin\theta_1 = 0.55154$ $\mu$m and $A_0$=1 mm, the expression (7) becomes as follows.

$$1/1000 * \cos 45° = 1/0.55154 - 1/A_2 \quad (10)$$

According to the above expression, $A_2$ can be calculated as 0.55176 $\mu$m which is only 0.04% different from $A_1$. By setting the spot diameter of the incident beam to approximately 2 mm, one or two fringes may be observed within the spot diameter. Since the fringes are moved in accordance with the movement of the movable diffraction grating 24, a sine waveform signal as shown in FIG. 9 can be obtained by receiving the beam with a single light receiving element 27.

According to the construction of the encoder shown in FIG. 11, large interference fringes can be formed within the collimated beam spot, and thus only a single light receiving element 27, which is appropriately positioned within the spot diameter, is needed to sense the intensity change due to the interference fringes. Therefore, the condenser lens to condense the beams to a light receiving element can be eliminated, resulting in easy adjustment of the light receiving element which adjustment is required for an accurate measurement of the movement of the movable diffraction grating.

Figure 13:
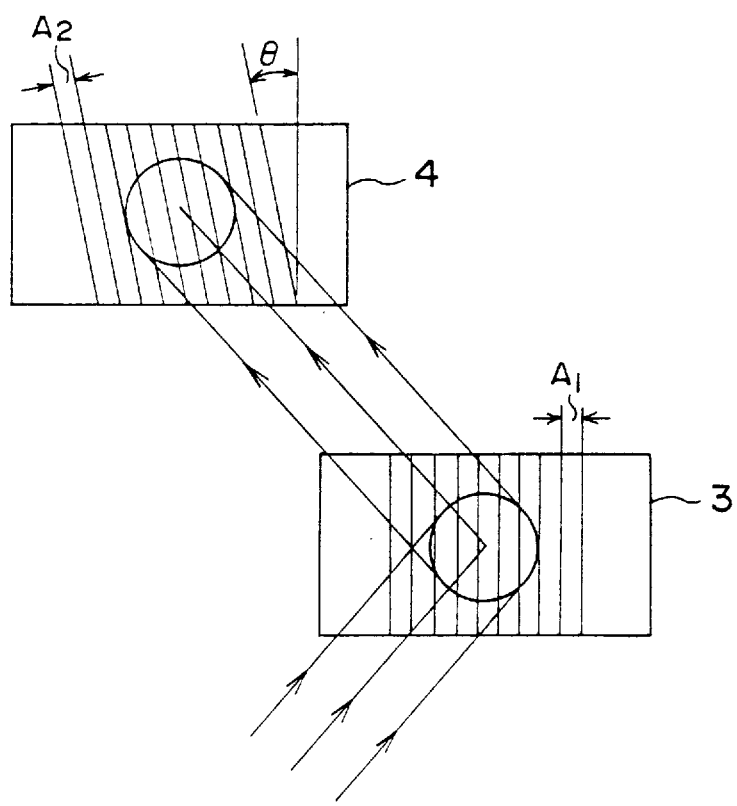
FIG. 13 is an illustration for explaining another example of the encoder shown in FIG. 4.

FIG. 13 shows an example in which the beams J and K are made to be converge by setting the direction of the grating 4 being slightly inclined (angle θ) from the direction of the grating 3. The pitch $A_1$ is equal to the pitch $A_2$. According to this construction, the beams J and K are also made to converge.

It should be noted that although, in the above-mentioned embodiments and variations thereof, the movable diffraction grating 4 or 24 is moved linearly in the direction indicated by the arrow R so as to form a linear encoder, a rotary encoder can also be formed using the principle of the present invention.

Figure 14:
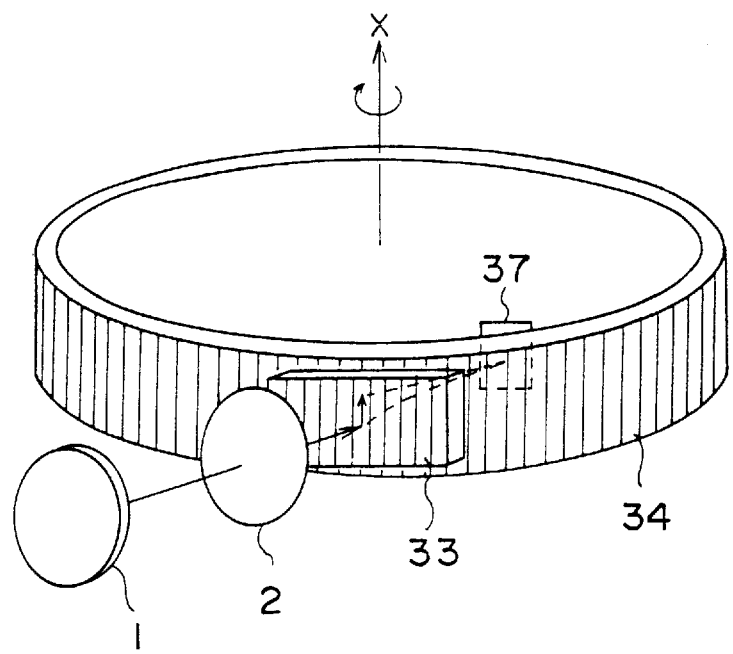
FIG. 14 is an illustration of a rotary encoder according to the present invention.
Figure 15:
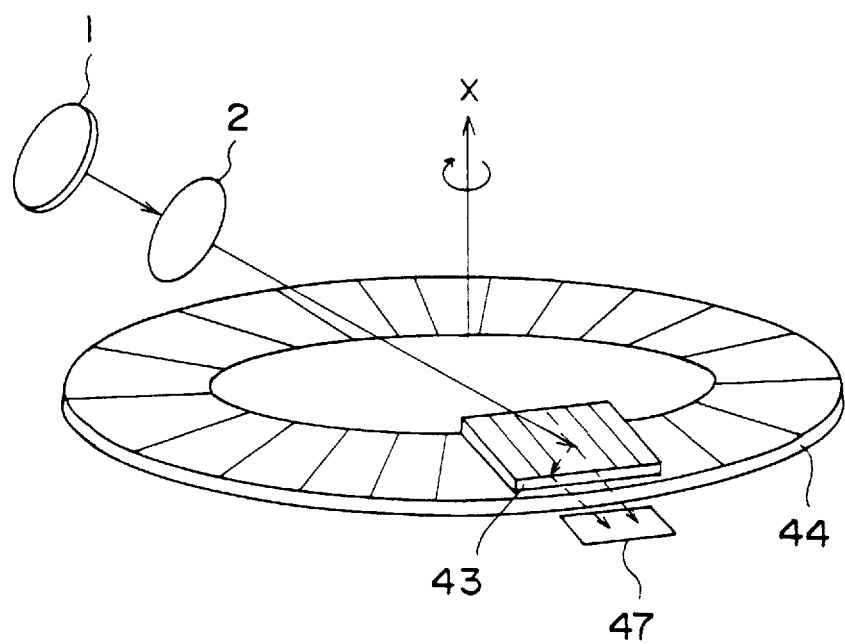
FIG. 15 is an illustration of a rotary encoder according to the present invention.

FIGS. 14 and 15 show examples of a rotary encoder using the principle of the present invention. The rotary encoder of FIG. 14 comprises the light source 1, the lens 2 which collimates the light beam emitted by the light source 1, a fixed diffraction grating 33, a movable diffraction grating 34 which is formed on a cylindrical surface, and a light receiving element 37. The movable diffraction grating 34 is rotatable about the axis X. The rotary encoder of FIG. 15 comprises the light source 1, the lens 2 which collimates the light beam emitted by the light source 1, a fixed diffraction grating 43, a movable diffraction grating 44 which is formed on a plane circular surface, and a light receiving element 47. The movable diffraction grating 44 is rotatable about the axis X. $A_1$ the structures described with respect to the linear encoder of FIGS. 4 through 11 may be applied to the rotary encoders of FIGS. 14 and 15 with the same advantages mentioned above.

FIG. 16 is an illustration of a second embodiment of an encoder according to the present invention. The encoder of FIG. 16 comprises the light source 1, the lens 2 which collimates the light beam emitted by the light source 1, diffraction gratings 53 and 54 and a light receiving element 57. The gratings 53 and 54 are arranged in parallel to each other. The pitch $A_1$ of the grating 53 is slightly different from the pitch $A_2$ of the grating 54.

In the second embodiment, ±nth order diffraction beams are generated by the fixed diffraction grating 53, and the diffraction beams are incident on the movable diffraction grating 54. The movable diffraction grating 54 generates the ±mth order diffraction beams of the ±nth order diffraction beams. Hereupon, ±nth (±mth) means the nth (mth) order diffraction beams directed to opposite sides of the optical axis of the incident beam. The interference fringes can be formed on the light receiving element 57 using the ±mth order diffraction beams which exit from the movable diffraction grating 54.

Figure 17:
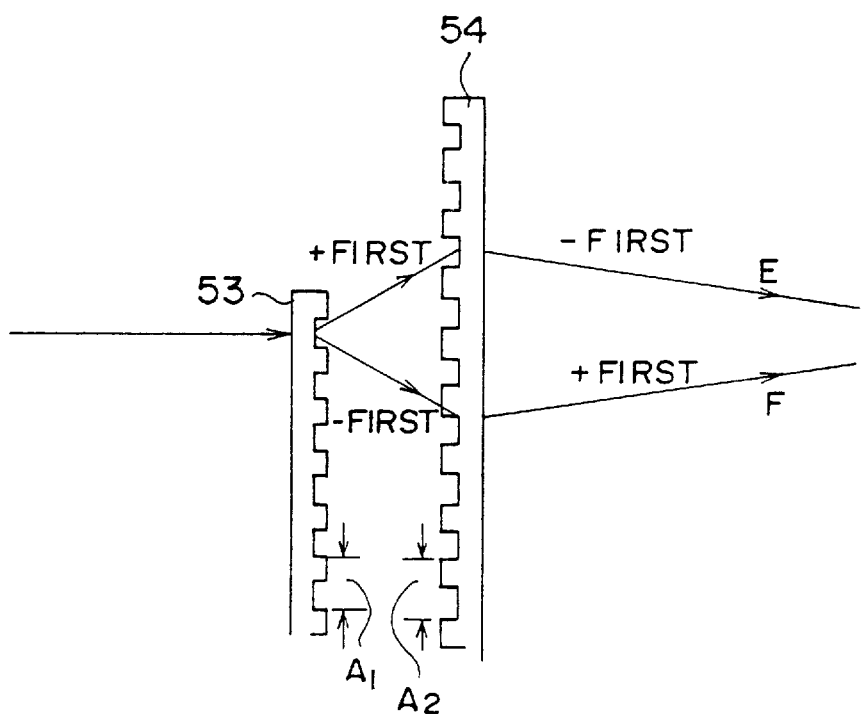
FIG. 17 is an illustration of the encoder shown in FIG. 16 in which the first order diffraction beams of two gratings are used.
Figure 18:
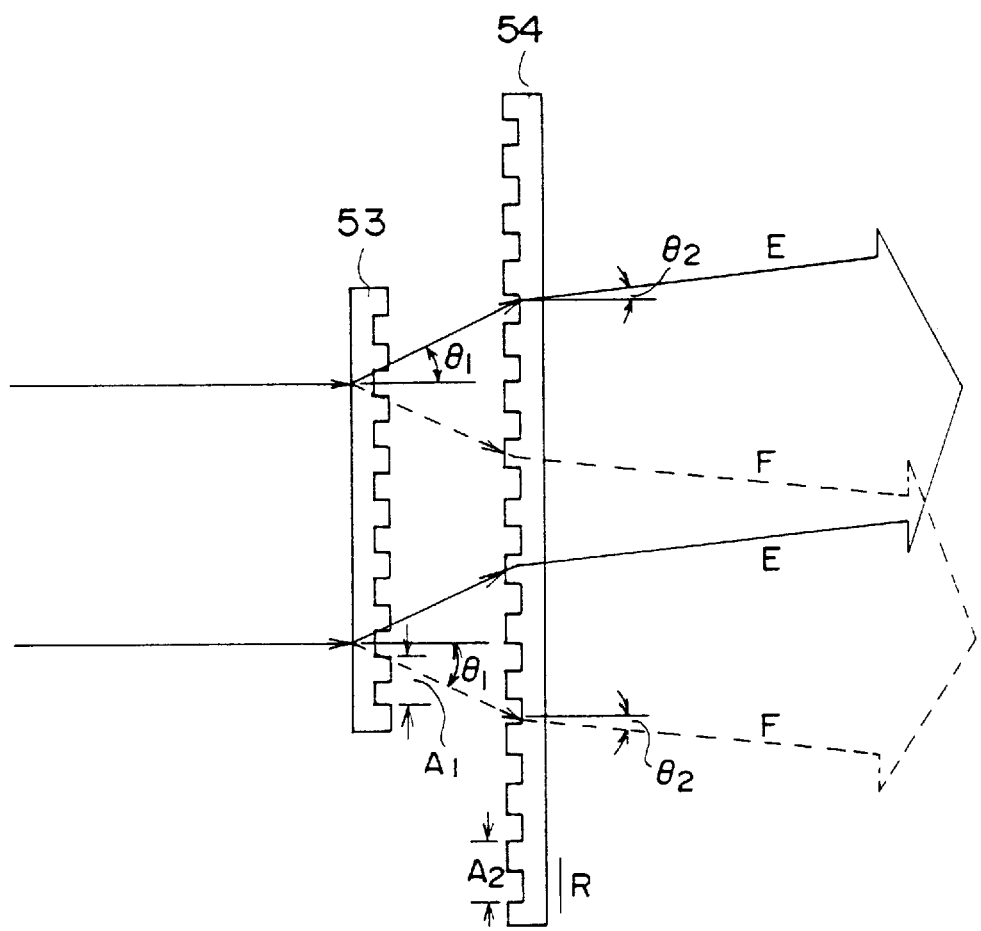
FIG. 18 is an illustration for explaining an operation principle of the encoder shown in FIG. 17.

FIG. 17 is an illustration for explaining an example in which the first diffraction beams of the fixed diffraction grating and movable diffraction grating are used. In the construction shown in FIG. 14, the light beam emitted by the light source 1 is collimated by the lens 2, and incident on the fixed diffraction grating 53. The first diffraction beams are generated to either side of the optical axis of the incident beam. Hereinafter, for the sake of convenience, diffraction beams directed upward relative to the optical axis of the incident beam are represented by prefixing + (e.g. + first diffraction beam), and diffraction beams directed downward relative to the optical axis of the incident beam are represented by prefixing − (e.g. − first diffraction beam). The ± first diffraction beams are incident on the movable diffraction grating 54 so that ± first diffraction beams of the ± first diffraction light generated by the fixed diffraction grating 53 are generated. Among the first diffraction beams which exit from the movable diffraction grating 54, the − first diffraction beam E due to the + first diffraction beam of the fixed diffraction grating 53 and the + first diffraction beam F due to the − diffraction beam of the fixed diffraction grating 53 are incident on the light receiving element 57. It should be noted that, in the second embodiment, since the pitches $A_1$ and $A_2$ are slightly different from each other, the beams E and F are not parallel, and can be condensed on the light receiving element 57 as previously described. Accordingly the beams E and F can form the interference fringes on the light receiving element 57.

A description will now be given, with reference to FIG. 15, of the principle of the second embodiment.

When a collimated beam is incident on the fixed diffraction grating 53 in a direction perpendicular to the plane of the fixed diffraction grating 53, the condition of diffraction at the fixed diffraction grating 53 is represented by the following expression.

$$\sin \theta_1 = \lambda / A_1 \qquad (11)$$

Where $\theta_1$ is the diffraction angle at the fixed diffraction grating 53; $A_1$ is the pitch of the fixed diffraction grating 53; $\lambda$ is the wavelength of the collimated beam from the light source 1.

The condition of diffraction at the movable diffraction grating 54 is represented by the following expression.

$$-\sin \theta_2 + \sin \theta_1 = \lambda / A_2 \qquad (12)$$

Where $\theta_2$ is the diffraction angle at the movable diffraction grating 54; $A_2$ is the pitch of the movable diffraction grating 54; $\lambda$ is the wavelength of the collimated beam from the light source 1.

According to the expressions (11) and (12), the following expression can be obtained with respect to the diffraction angle $\theta_2$ of the movable diffraction grating 54.

$$\sin \theta_2 = \lambda (1/A_1 - 1/A_2) \qquad (13)$$

The angle formed between beams E and F are twice the angle $\theta_2$, and the interference fringes having a pitch $A_0$ are generated in accordance with the angle $\theta$. The relationship between the pitch $A_1$ and the diffraction angle $\theta_2$ is represented by the following expression.

$$\sin \theta_2 = \lambda / (2 A_0) \qquad (14)$$

using the expressions (13) and (14), the relationship among $A_1$, $A_2$ and $A_3$ is represented by the following expression.

$$1/(2 A_0) = 1/A_1 - 1/A_2 \qquad (15)$$

Apparent from the expression (15), the pitch $A_0$ of the interference fringes is related only to the pitch $A_1$ of the fixed diffraction grating 53 and the pitch $A_2$ of the movable diffraction grating 54. That is, the pitch $A_0$ of the interference fringes is not related to the wavelength $\lambda$ of the light beam emitted by the light source 1. Accordingly, there is no effect related to temperature change even if a semiconductor laser having a relatively large wavelength fluctuation is used as the light source 1.

Figure 19:
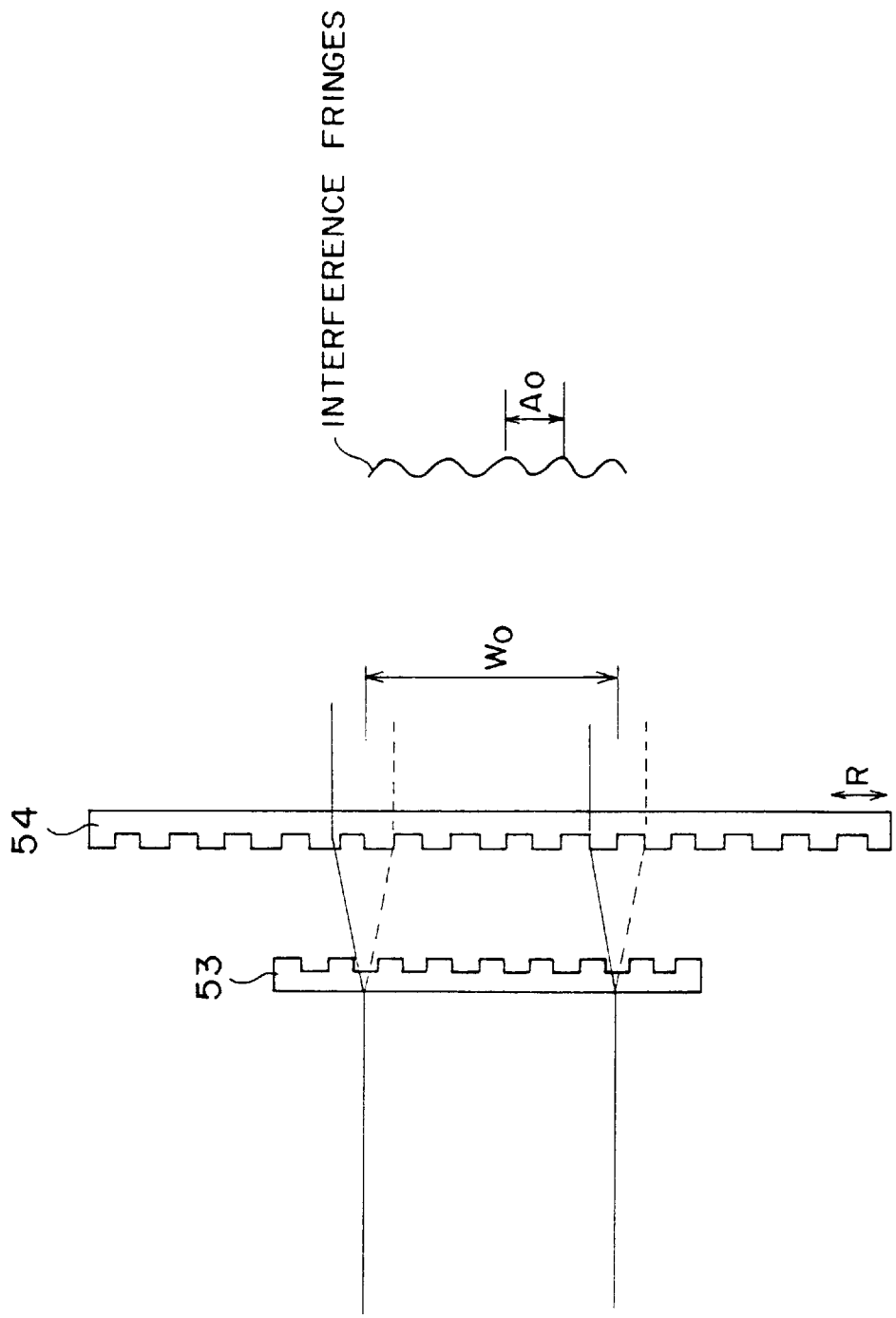
FIG. 19 is an illustration for explaining interference fringes formed in the encoder shown in FIG. 17.

Additionally, supposing the beam diameter of the collimated beam incident on the fixed diffraction grating 53 is $W_0$, as shown in FIG. 19, and the right side and the left side of the expression (15) are multiplied by $W_0$, the following expression is obtained.

$$(W_0/A_0)/2 = W_0/A_1 - W_0/A_2 \qquad (16)$$

Where $W_0/A_0$ is the number of interference fringes within the beam diameter; $W_0/A_1$ is the number of lines of the fixed diffraction grating 53 within the beam diameter; $W_0/A_2$ is the number of lines of the movable diffraction grating 54 within the beam diameter.

The following relationship is obtained in accordance with the expression (16).

(number of interference fringes)/2 = (17)

(number of grids of fixed diffraction grating within beam diameter) −

(number of grids of movable diffraction grating within beam diameter)

According to the relationship (17), it is understood that by appropriately setting the pitches $A_1$ and $A_2$, an arbitrary number of interference fringes can be obtained. For example, when using a high density grating such as $A_1 = 0.948$ μm so as to obtain a high resolution, and when $A_0 = 1$ mm is desired, $A_2$ should be set to 0.94768 μm which is 0.03% different from $A_1$. Such gratings having slightly different pitches can be made by the conventional technique. In the present case, if the beam diameter of the collimated beam is 2 mm, one or two interference fringes are observed within the beam diameter.

Figure 20:
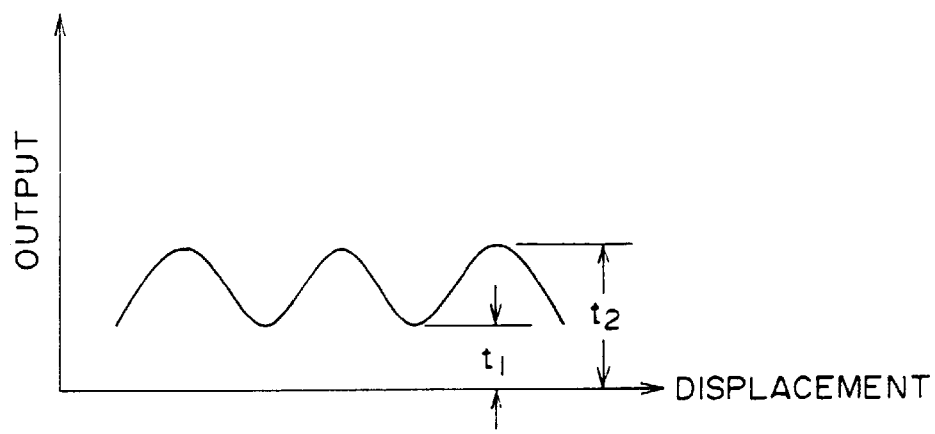
FIG. 20 is a graph showing an output signal from a light receiving element of the encoder shown in FIG. 17.

Since the interference fringes are moved according to a displacement of the movable diffraction grating 54, a sine waveform signal as shown in FIG. 20 can be obtained by receiving the beams E and F with the light receiving element 57 having a small light-receiving surface. If the + first diffraction beam and the − first diffraction beam are used as shown in FIG. 17, two periods of sine waveform signal are output from the light receiving element 57 during the movement corresponding to a single pitch of the movable diffraction grating 54.

As mentioned above, the second embodiment of the present invention can perform an accurate measurement of the displacement of the movable diffraction grating regardless of temperature change. Additionally, large interference fringes can be formed within the collimated beam diameter, and thus only a single light receiving element 57, which is appropriately positioned within the beam diameter, is needed to sense the intensity change due to the interference fringes. Therefore, the condenser lens to condense the beams E and F to a light receiving element can be eliminated, resulting in easy adjustment of the light receiving element 57 which adjustment is required for an accurate measurement of the movement of the movable diffraction grating.

Although only the ± first diffraction beams are used in the encoder of FIG. 17 so as to eliminate noise, a higher order diffraction beams may be used so as to obtain a more accurate measurement because the resolution is proportional to the diffraction angle. The present invention can be applied to the case where a higher order diffraction beams are used. In such a case, the condition of diffraction at the fixed diffraction grating 53 is represented by the following expression.

$$\sin \theta_1 = n\lambda/A_1 \qquad (18)$$

Where n is the order of diffraction; $\theta_1$ is the diffraction angle at the fixed diffraction grating 53; $A_1$ is the pitch of the fixed diffraction grating 53; $\lambda$ is the wavelength of the collimated beam from the light source 1.

The condition of diffraction at the movable diffraction grating 54 is represented by the following expression.

$$-\sin \theta_2 + \sin \theta_1 = m\lambda/A_2 \qquad (19)$$

Where m is the order of diffraction; $\theta_2$ is the diffraction angle at the movable diffraction grating 54; $A_2$ is the pitch of the movable diffraction grating 54; $\lambda$ is the wavelength of the collimated beam from the light source 1.

According to the expressions (18) and (19), the following expression can be obtained with respect to the diffraction angle $\theta_2$ at the movable diffraction grating 54.

$$\sin \theta_2 = \lambda(n/A_1 - m/A_2) \qquad (20)$$

Using the expressions (14) and (20), the relationship among $A_1$, $A_2$ and $A_0$ is represented by the following expression.

$$1/(2A_0) = n/A_1 - m/A_2 \qquad (21)$$

Apparent from the expression (21), similarly to the case where only the ± first diffraction beams are used, the pitch $A_0$ of the interference fringes is related only to the pitch $A_1$ of the fixed diffraction grating 53 and the pitch $A_2$ of the movable diffraction grating 54. That is, the pitch $A_0$ of the interference fringes is not related to the wavelength of the light beam emitted by the light source 1. Accordingly, there is no effect related to temperature change even if a semiconductor laser having a relatively large wavelength fluctuation is used as the light source 1.

Additionally, supposing the beam diameter of the collimated beam incident on the fixed diffraction grating 53 is $W_0$, as shown in FIG. 19, and the right side and the left side of the expression (15) are multiplied by $W_0$, the following expression is obtained.

$$(W_0/A_0)/2 = nW_0/A_1 - mW_0/A_2 \qquad (22)$$

Where $W_0/A_0$ is the number of interference fringes within the beam diameter; $nW_0/A_1$ is the number of lines of the fixed diffraction grating 53 within the beam diameter multiplied by the order of diffraction n; $mW_0/A_2$ is the number of lines of the movable diffraction grating 54 within the beam diameter multiplied by the order of diffraction m.

The following relationship is obtained in accordance with the expression (22).

$$\text{(number of interference fringes)}/2 = \qquad (23)$$

$$\text{(order of diffraction)} \times$$

$$\text{(number of lines of fixed diffraction grating within beam diameter)} -$$

$$\text{(order of diffraction)} \times$$

$$\text{(number of lines of movable diffraction grating within beam diameter)}$$

As mentioned above, higher order diffraction beams can be used so as to obtain a more accurate measurement than a case where the first diffraction beams are used, and thus in the present case a higher resolution of measurement can be obtained with the same effects mentioned previously.

In the second embodiment and variation thereof, although the same order of diffraction beams are used to form the interference fringes on the light receiving element, different order of diffraction beams, that is beams having different angles of diffraction, can be used in accordance with the present invention.

Figure 21:
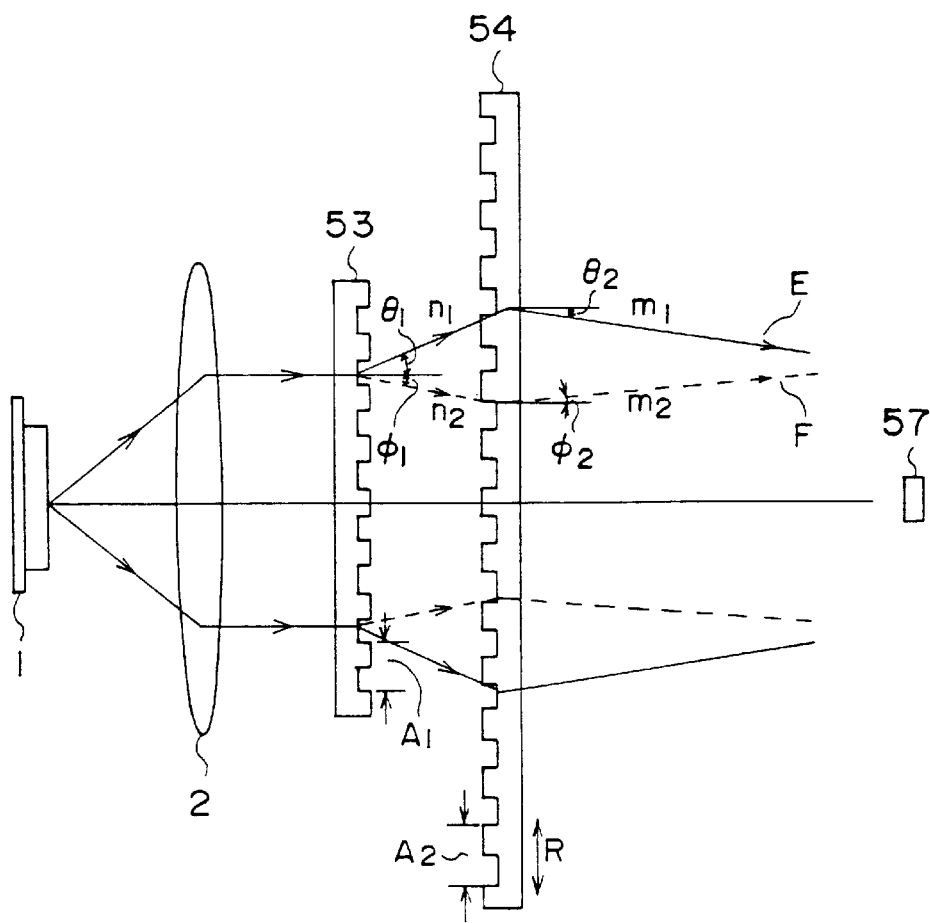
FIG. 21 is an illustration of an encoder of the second embodiment which is expanded to use higher order diffraction beams.

FIG. 21 shows a case where the diffraction angle of the beam E is different from the diffraction angle of the beam F. The beam E is the $m_1$th diffraction beam (diffraction angle $\theta_2$) at the movable diffraction grating 54 generated from the $n_1$th diffraction beam (diffraction angle $\theta_1$) at the fixed diffraction grating 53. The beam F is the $m_2$th diffraction beam (diffraction angle $\phi_2$) at the movable diffraction grating 54 generated from the $n_2$th diffraction beam (diffraction angle $\phi_1$) at the fixed diffraction grating 53. In this case, the following relation is established for the beam E.

$$\sin \theta_1 = n_1\lambda/A_1 \qquad (24)$$

$$-\sin \theta_2 + \sin \theta_1 = m_1\lambda/A_2 \qquad (25)$$

According to the expressions (24) and (25), the following expression can be obtained with respect to the diffraction angle $\theta_2$ at the movable diffraction grating 54.

$$\sin \theta_2 = \lambda(n_1/A_1 - m_1/A_2) \qquad (26)$$

Similarly, the following relationship is established for the beam F.

$$\sin \phi_2 = -\lambda(n_2/A_1 - m_2/A_2) \qquad (27)$$

Additionally, the pitch $A_0$ of the interference fringes is represented by the following expression.

$$A_0 = \lambda/(\sin \theta_2 + \sin \phi_2) \qquad (28)$$

Using the expressions (26), (27) and (28), the following relationship is obtained among $A_1$, $A_2$ and $A_0$.

$$A_0 1/[(n_1-n_2)/A_1-(m_1-m_2)/A_2] \quad (29)$$

It is understood from the expression (29) that in the present case, the pitch $A_0$ of the interference fringes is related, similarly to the previously described embodiment, only to the pitch $A_1$ of the fixed diffraction grating 53 and the pitch $A_2$ of the movable diffraction grating 54. Therefore, the interference fringes are not affected by a fluctuation of the wavelength of the light beam emitted by the light source 1, and thus a semiconductor laser having a relatively long wavelength can be used as the light source 1.

In the present case, an arbitrary number of interference fringes can be formed by setting $A_1$, $A_2$, $n_1$, $n_2$, $m_1$ and $m_2$ to appropriate values. If a light receiving element having a light receiving surface smaller than the pitch $A_0$ of the interference fringes is used, a sine waveform signal is obtained from the output of the light receiving element. When the $m_1$th (or $m_2$th) order diffraction beam and a transmission beam (corresponding to $m_1$ or $m_2$ equal to 0) at the movable diffraction grating 54 are used, a phase shift is generated in the direction opposite to the moving direction of the movable diffraction grating 54. The number of complete cycles (periods) of the sine waveform equal to twice the order of diffraction ($2|m_1|$ or $2|n_1|$) at the moving grating can be obtained. In the present case, since the $m_1$th diffraction beam is used at the moving grating (movable diffraction grating 54), the number of periods is $2|m_1|$.

In order to obtain generally parallel beams exiting from the movable diffraction grating 54, in a condition where $A_1=A_0$ for example, the following relationship must be satisfied.

$$n_1+m_1=n_2+m_2 \quad (30)$$

For example, the interference occurring between the transmission beam of the movable diffraction grating 54 coming from the + first diffraction beam at the fixed diffraction grating 53 and the − second diffraction beam at the movable diffraction grating 54 coming from the + third diffraction beam at the fixed diffraction grating 53 satisfies the above relationship (30) since 1+0=−2+3, and therefore this combination of beams can be used. In this case the resolution is three times as high as the case where the first diffraction beams are used since three periods ($m_1+m_2=0+3=3$) of the sine waveform signal are obtained.

Additionally, using the higher order diffraction beams, a relatively large difference between the pitches $A_1$ and $A_2$ can be obtained. Specifically, in a case where the pitch $A_1$ of the fixed diffraction grating 53 is as small as 1 μm and the pitch $A_0$ of the interference fringes is as large as 2 mm (corresponding to the beam diameter of the collimated beam), if $n_1=1$, $n_2=-1$, $m_1=-2$ and $m_2=2$, the pitch $A_2$ of the movable diffraction grating 54 can be 2.0005 μm, which is twice as large as the pitch $A_1$. Therefore, the pitch $A_2$ of the movable diffraction grating, which requires a large pitch compared to the pitch $A_1$ of the fixed diffraction grating due to its size, can be large enough to eliminate problems in the precision manufacturing of the movable diffraction grating.

It should be noted that although, in the above-mentioned embodiment and variations thereof, the movable diffraction grating 54 is moved linearly in the direction indicated by the arrow R so as to form a linear encoder, a rotary encoder can also be formed using the principle of the present invention.

Figure 22:
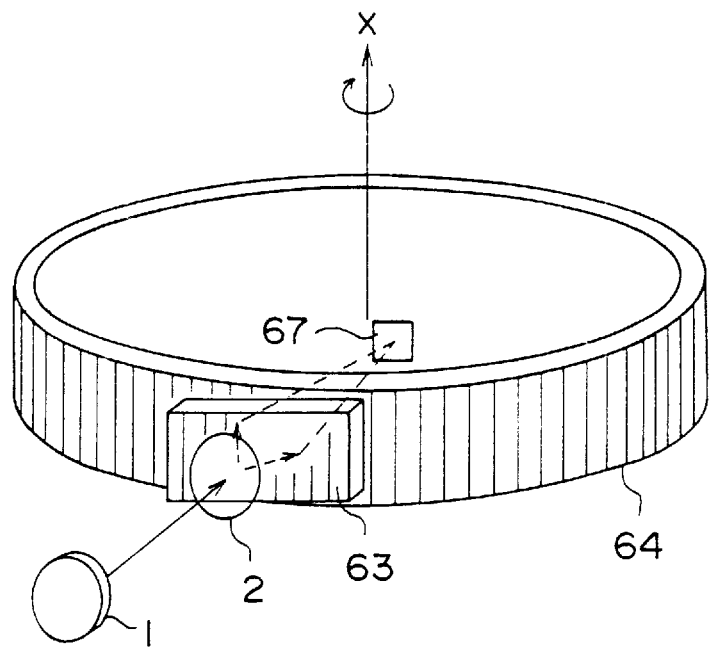
FIG. 22 is an illustration of a rotary encoder according to the present invention.
Figure 23:
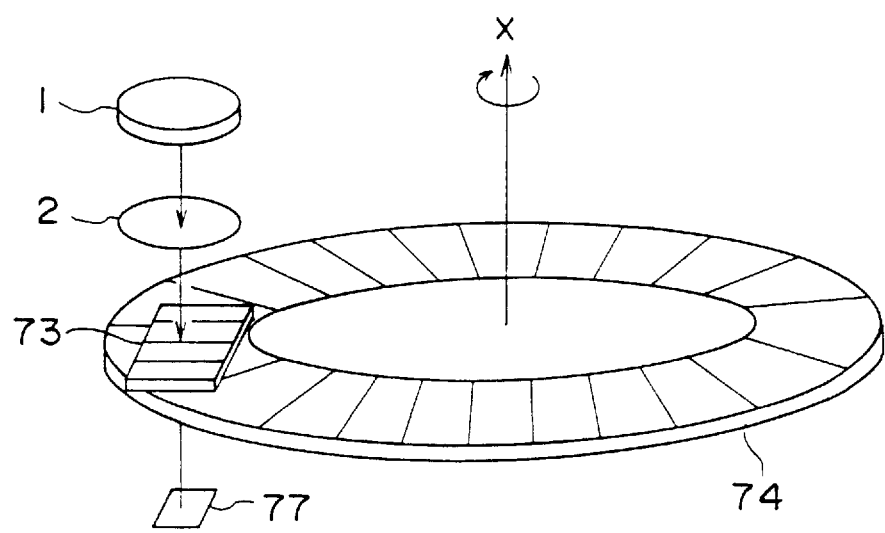
FIG. 23 is an illustration of a rotary encoder according to the present invention.

FIGS. 22 and 23 show examples of a rotary encoder using the principle of the present invention. The rotary encoder of FIG. 22 comprises the light source 1, the lens 2 which collimates the light beam emitted by the light source 1, a fixed diffraction grating 63, a movable diffraction grating 64 which is formed on a cylindrical surface, and a light receiving element 67. The movable diffraction grating 64 is rotatable about the axis X. The rotary encoder of FIG. 23 comprises the light source 1, the lens 2 which collimates the light beam emitted by the light source 1, a fixed diffraction grating 73, a movable diffraction grating 74 which is formed on a flat circular surface, and a light receiving element 77. The movable diffraction grating 74 is rotatable about the axis X. In the rotary encoder shown in FIGS. 22 and 23, the movement (displacement) information, including amount of rotation and rotation speed, of the movable diffraction grating can be obtained without having a condenser lens. Further, all the structures described with respect to the linear encoder of FIGS. 16 through 21 may be applied to the rotary encoders of FIGS. 14 and 15 with the same advantages mentioned previously.

A description will now be given of a third embodiment of an encoder according to the present invention. FIG. 24 is an illustration showing a structure of the third embodiment according to the present invention. The third embodiment comprises, in addition to the second embodiment shown in FIG. 16 or FIG. 21, reflecting means (a mirror) 81 and splitting means (a beam splitter) 82. The mirror 81 is arranged on the opposite side of the fixed diffraction grating 53 with respect to the movable diffraction grating 54 so that the beams exiting from the movable diffraction grating 54 are reflected toward the movable diffraction grating 54. The beam splitter 82 is provided between the lens 2 and the fixed diffraction grating 53. It should be noted that the reflecting means 81 may be integrally formed with the movable diffraction grating 54 on the opposite side of the fixed diffraction grating 53.

In the above-mentioned structure, the collimated beam collimated by the lens 2 transmits through the splitting means 82, and is incident on the fixed diffraction grating 53 and, in turn, the movable diffraction grating 54. The collimated beam is split by the splitting means, and the split collimate beam is directed to the light receiving element 7. The diffraction beams exiting from the movable diffraction grating 54 are reflected by the reflecting means 81, and return to the splitting means 82 via the movable diffraction grating 54 and fixed diffraction grating 53. The returning beam is then split by the splitting means 82 and the split returning beam is received by the light receiving element 7. Accordingly, interference fringes are formed on the light receiving element 7 by the split collimated beam and the split returning beam.

Figure 25:
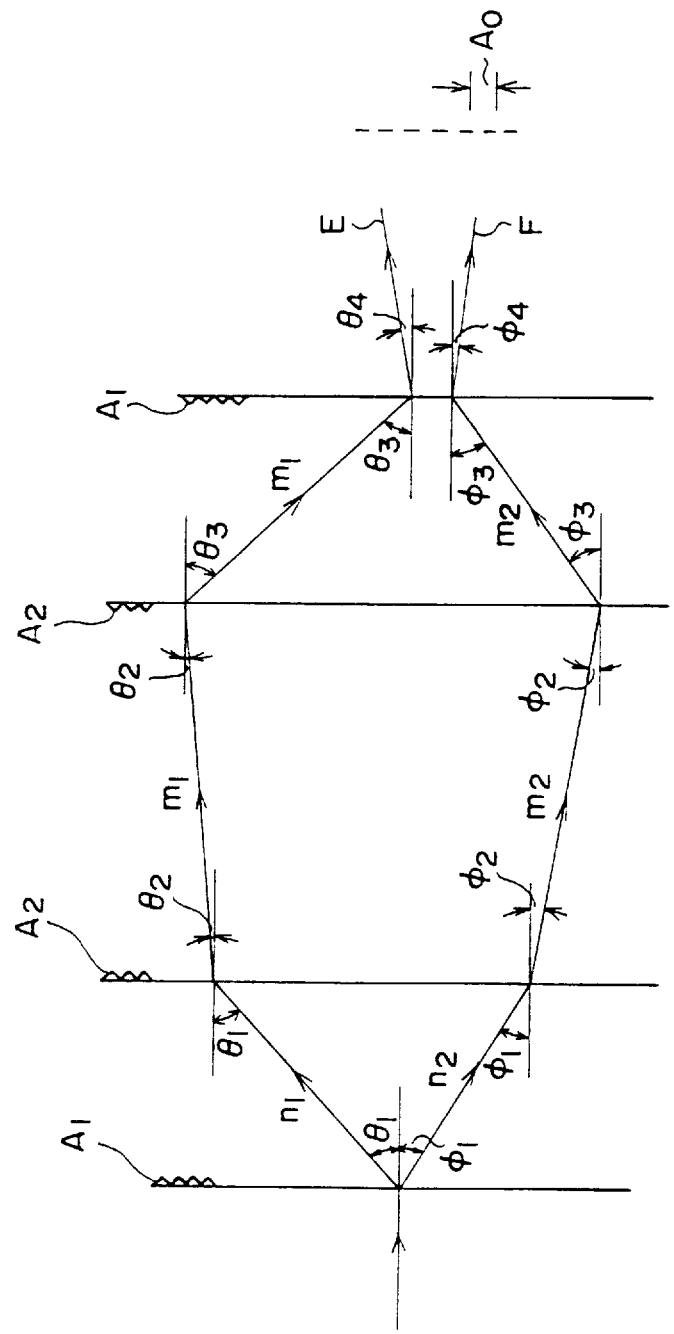
FIG. 25 is an illustration showing an optical system equivalent to the encoder shown in FIG. 24.

The optical system shown in FIG. 24 is equivalent to an optical system shown in FIG. 25. A description will now be given, with reference to FIG. 25, of conditions of the diffraction beams of FIG. 24. In this case, interference fringes are formed by the beams E and F similarly to the second embodiment mentioned previously.

The beam E is a $m_1$th diffraction beam, at a grating having the pitch $A_2$, of the $n_1$th diffraction beam of the collimate beam incident on the grating having the pitch $A_1$. The beam F is a $m_2$th diffraction beam, at a grating having the pitch $A_2$, of the $n_2$th diffraction beam of the collimate beam incident on the grating having the pitch $A_1$.

Supposing, for the sake of convenience of description, the collimate beam is incident on the fixed diffraction grating 53 in a direction perpendicular to the surface of the fixed diffraction grating 53, the following expressions are established.

$$\sin \theta_1 = n_1 \lambda / A_1 \tag{31a}$$

$$\sin \theta_1 - \sin \theta_2 = m_1 \lambda / A_2 \tag{31b}$$

$$\sin \theta_2 + \sin \theta_3 = m_1 \lambda / A_2 \tag{31c}$$

$$\sin \theta_3 + \sin \theta_4 = n_1 \lambda / A_1 \tag{31d}$$

According to the expressions (31a) through (31d), the following expression can be obtained with respect to the diffraction angle $\theta_4$.

$$\sin \theta_4 = 2\lambda(n_1/A_1 - m_1/A_2) \tag{32}$$

Similarly, the following relationship is established for the beam F.

$$\sin \phi_4 = 2\lambda(n_2/A_1 - m_2/A_2) \tag{33}$$

Additionally, the pitch $A_0$ of the interference fringes is represented by the following expression.

$$A_0 = \lambda/(\sin \theta_4 + \sin \phi_4) \tag{34}$$

Using the expressions (32), (33) and (34), the following relationship is obtained among $A_1$, $A_2$ and $A_0$.

$$A_0 = 1/[2((n_1 - n_2)/A_1 - (m_1 - m_2)/A_2)] \tag{35}$$

It is understood from the expression (35) that in the present case, the pitch $A_0$ of the interference fringes is related, similarly to the previously described embodiment, only to the pitch $A_1$ of the fixed diffraction grating 53 and the pitch $A_2$ of the movable diffraction grating 54. Therefore, the interference fringes are not affected by a fluctuation of the wavelength of the light beam emitted by the light source 1.

In the present case, an arbitrary number of interference fringes can be formed by setting $A_1$, $A_2$, $n_1$, $n_2$, $m_1$ and $m_2$ to appropriate values. If a light receiving element 7 having a light receiving surface smaller than the pitch $A_0$ of the interference fringes is used, a sine waveform signal is obtained from the output of the light receiving element 7. When the $m_1$th (or $m_2$th) order diffraction beam at the movable diffraction grating 54 is used, a phase shift is generated in the direction opposite to the moving direction of the movable diffraction grating 54. Because the beam is diffracted twice at the movable diffraction grating 54, complete periods of sine waveform corresponding in number to four times the order of diffraction ($4|m_1|$ or $4|m_2|$) at the movable diffraction grating can be obtained. This results in that the resolution of measurement is four times that of the encoder shown in FIG. 21.

In the first and second embodiments, only a point light source can be used such as a semiconductor laser or a light emitting diode having a light emitting surface diameter smaller than 10 μm. On the other hand, the third embodiment is able to be provided with a light emitting diode having a wide light-emitting surface, which diode does not provide a point light source. When the light source 1 comprises a point light source such as a semiconductor laser, as shown in FIG. 26A, the beams E and F can form appropriate interference fringe because the origin of the beams E and F is the same. On the other hand, if the light source 1 comprises a light emitting element having a wide light-emitting surface, as shown in FIG. 26B, appropriate interference fringes are not formed because the origin of the beams E and F are not the same. Therefore, the light emitting diode having a wide light-emitting surface cannot be used for the first and second embodiments.

On the other hand, in the third embodiment, since the beams E and F are generated always from the same collimate beam, an appropriate interference fringes are always formed even if the light emitting diode having a wide light-emitting surface is used as the light source 1.

Figure 27:
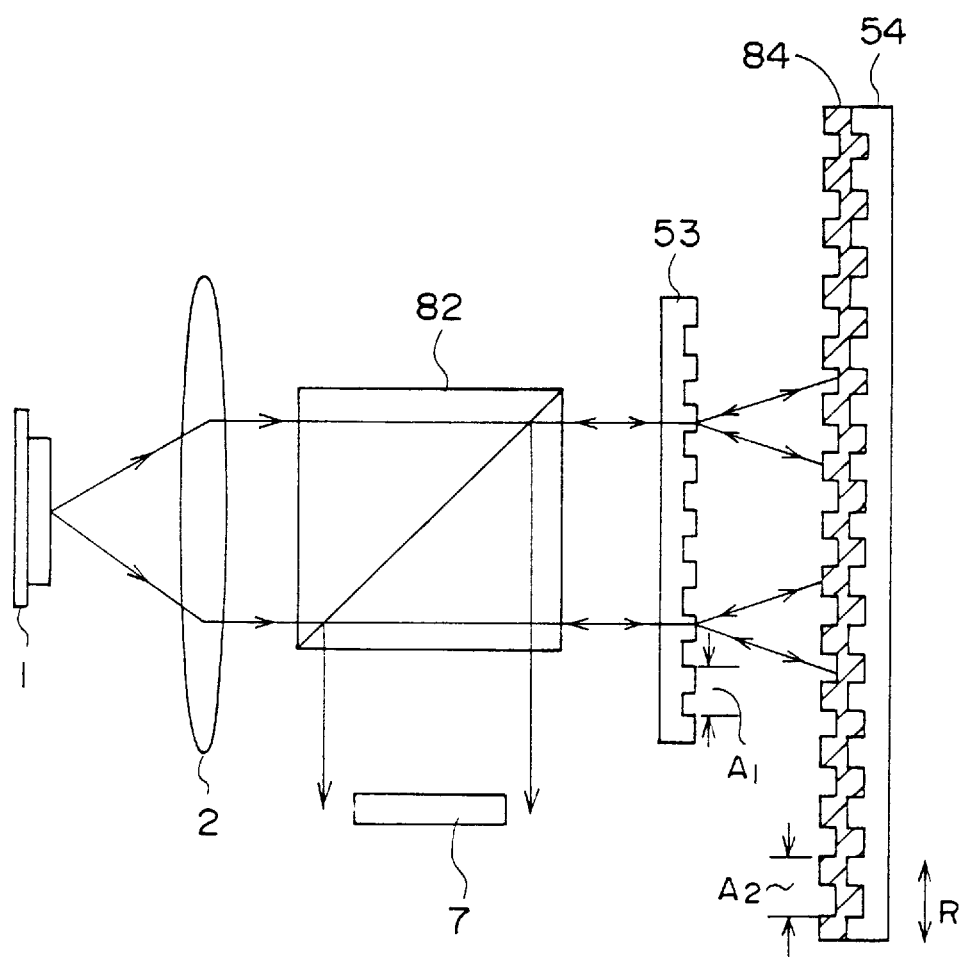
FIG. 27 is an illustration of a variation of the encoder shown in FIG. 24.

FIG. 27 is an illustration of a structure of a variation of the encoder shown in FIG. 24. In the encoder shown in FIG. 24, reflecting means 84 is provided on the movable diffraction grating 54 instead of the reflecting means 81 of FIG. 24. The reflecting means 84 comprises a thin metal film such as aluminum formed by means of vapor deposition, sputtering or the like on the surface of the movable diffraction grating 54. In the present variation, the pitch $A_2$ of the movable diffraction grating 54 is approximately one half of the pitch $A_1$ of the fixed diffraction grating 53.

In the above-mentioned variation, the beam emitted by the light source 1 undergoes diffraction twice at the fixed diffraction grating 53, and once at the movable diffraction grating 54. The pitch $A_0$ of the interference fringes formed on the light receiving element is represented by the following expression.

$$A_0 = 1/[2(n_1 - n_2)/A_1 - (m_1 - m_2)/A_2] \tag{36}$$

The expression (36) is obtained as follows. For the sake of convenience of description, it is supposed that the ± first diffraction beams are used as $n_1$, $n_2$, $m_1$ and $m_2$. The expression (35) is transformed as follows.

$$\begin{aligned} A_0 &= 1/[4(1/A_1 - 1/A_2)] \\ &= 1/[2(2/A_1 - 1/(A_2/2))] \end{aligned} \tag{37}$$

In the above-mentioned variation, when the grating having the pitch $A_1$ is moved, periods of sine waveform corresponding in number to four times the order of diffraction at the moving grating is obtained while the grating moves by one pitch. When the grating having the pitch $A_2$ is moved, periods of sine waveform corresponding in number to twice the order of diffraction at the moving grating is obtained while the grating moves by one pitch. Although the number of periods is one half of that of the encoder shown in FIG. 24, the resolution is four times that of the first and second embodiments since the pitch $A_2$ is approximately one half of the pitch $A_1$.

Additionally, thanks to the reflection means 84, a light emitting diode having a wide light-emitting surface can be used as the light source as previously described.

It should be noted that although the beam transmitted through the beam splitter 82 is directed to the gratings 53 and 54, the split beam may be directed to the gratings 53 and 54. In this case the light receiving element should be arranged on the transmission side of the beam splitter 82.

A description will now be given, with reference to FIG. 28, of a fourth embodiment of an encoder according to the present invention. The encoder shown in FIG. 28 comprises a third diffraction grating 86 in addition to the encoder shown in FIG. 24. In this case the gratings 53 and 54 are fixed, and the grating 86 is movable.

Figure 28:
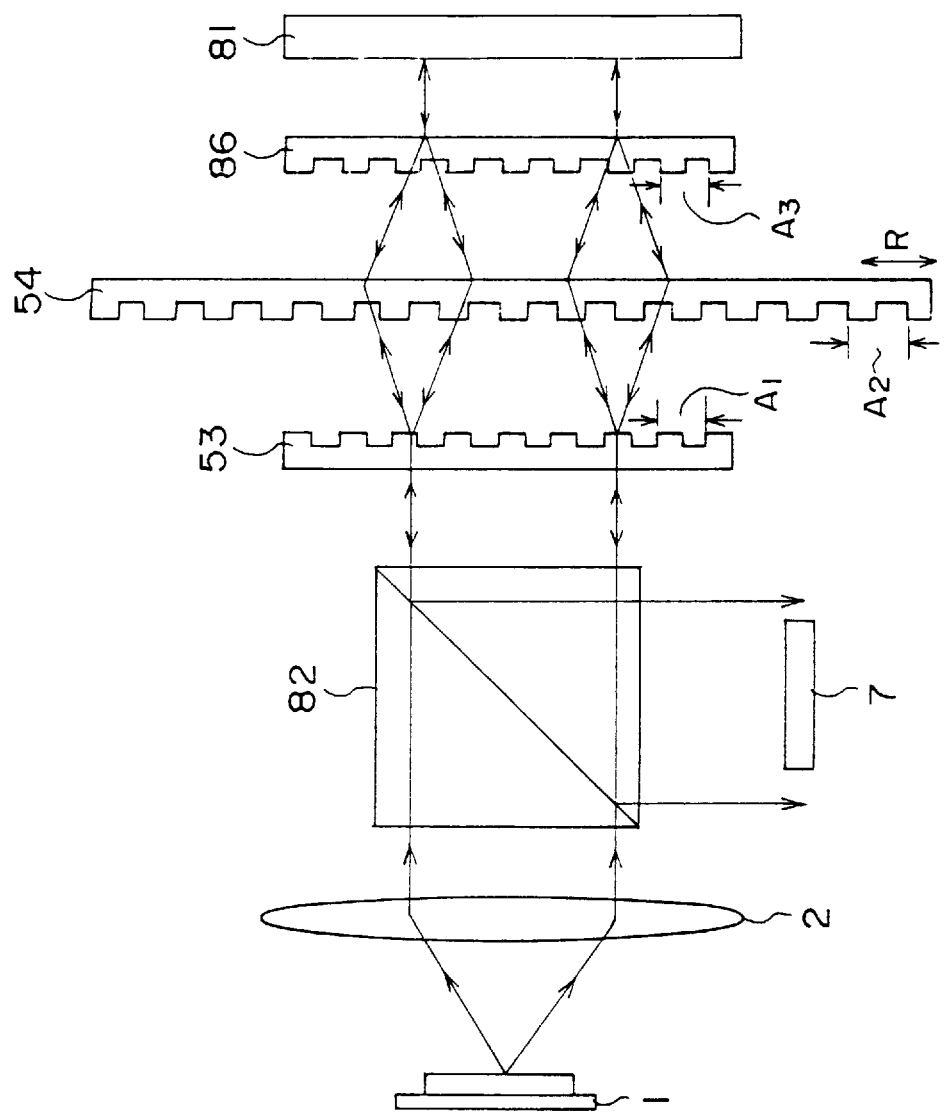
FIG. 28 is an illustration of a fourth embodiment of an encoder according to the present invention.
Figure 29:
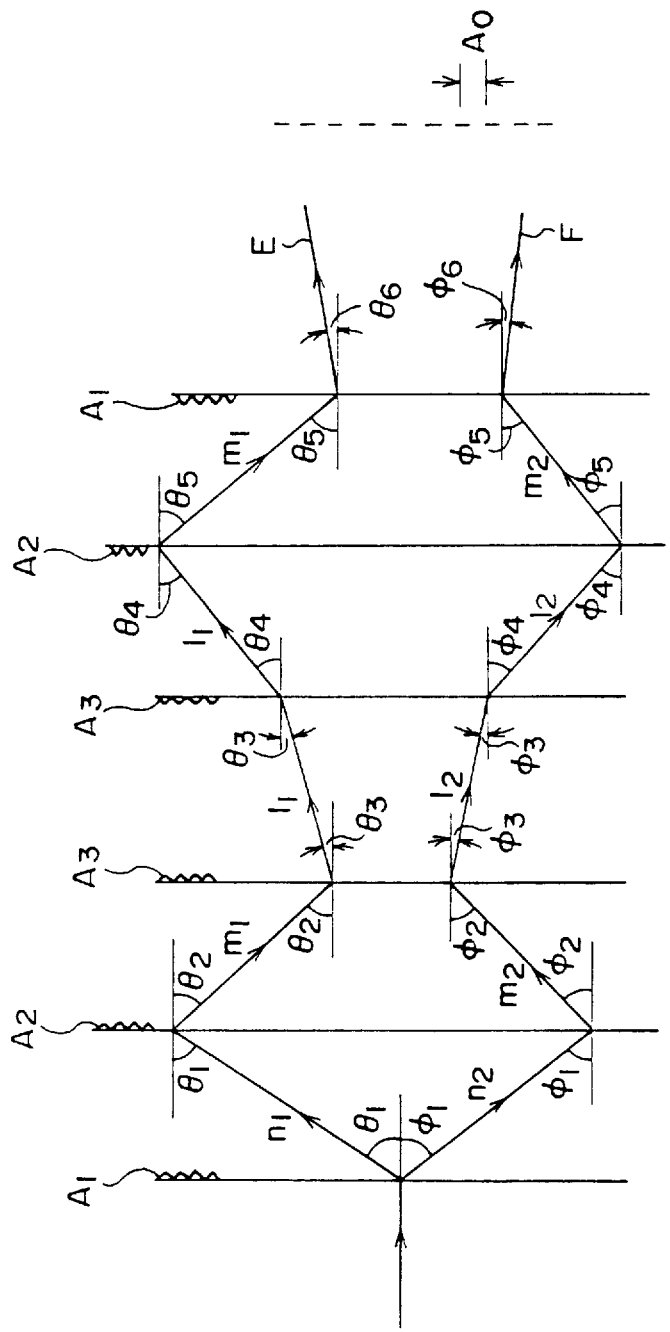
FIG. 29 is an illustration showing an optical system equivalent to the encoder shown in FIG. 28.

The optical system shown in FIG. 28 is equivalent to an optical system shown in FIG. 29. In the present embodiment, interference fringes are formed by the beams E and F similarly to the third embodiment previously mentioned with reference to FIG. 25. The generating process of the beams E and F is also similar to the third embodiment except that more diffractions are employed in the present embodiment, and descriptions thereof will be omitted. It should be noted that the pitch of the third grating 86 is referred to as $A_3$, and $l_1$ and $l_2$ represent orders of diffraction at the grating 86.

Supposing, for the sake of convenience of description, the collimate beam is incident on the fixed diffraction grating 53 in a direction perpendicular to the surface of the fixed diffraction grating 53, the following expressions are established.

$$\sin \theta_1 = n_1 \lambda / A_1 \quad (38a)$$

$$\sin \theta_1 + \sin \theta_2 = m_1 / A_2 \quad (38b)$$

$$\sin \theta_2 + \sin \theta_3 = l_1 / A_3 \quad (38c)$$

$$-\sin \theta_3 + \sin \theta_4 = l_1 / A_3 \quad (38d)$$

$$\sin \theta_4 + \sin \theta_5 = m_1 / A_2 \quad (38e)$$

$$\sin \theta_5 + \sin \theta_6 = n_1 / A_1 \quad (38f)$$

According to the expressions (38a) through (38f), the following expression can be obtained with respect to the diffraction angle $\theta_4$.

$$\sin \theta_6 = 2\lambda (n_1/A_1 - m_1/A_2 + l_1/A_3) \quad (39)$$

Similarly, the following relationship is established for the beam F.

$$\sin \phi_6 = 2\lambda (n_2/A_1 - m_2/A_2 + l_2/A_3) \quad (40)$$

Additionally, the pitch $A_0$ of the interference fringes is represented by the following expression.

$$A_0 = \lambda / (\sin \theta_6 + \sin \phi_6) \quad (41)$$

Using the expressions (39), (40) and (41), the following relationship is obtained among $A_1$, $A_2$ and $A_0$.

$$A_0 = 1/[2((n_1-n_2)/A_1 - (m_1-m_2)/A_2 + (l_1-l_2)/A_3)] \quad (42)$$

It is understood from the expression (42) that in the present case, the pitch $A_0$ of the interference fringes is related, similarly to the previously described embodiment, only to the pitch $A_1$ and $A_2$ of the fixed diffraction gratings 53 and 54 and the pitch $A_3$ of the movable diffraction grating 86. Therefore, the interference fringes are not affected by a fluctuation of the wavelength of the light beam emitted by the light source 1. Similarly to the third embodiment mentioned above, a phase shift of the interference fringes is generated in the direction opposite to the moving direction of the grating which is moved. Because each of the gratings 53, 54 and 86 are passed twice, complete periods of sine waveform corresponding to twice the order of diffraction $(2(|m_1|+|m_2|)$ or $2(|n_1|+|n_2|)$ or $2(|l_1|+|l_2|))$ can be obtained.

It should be noted that similarly to the third embodiment, a light emitting diode having a wide light-emitting surface can be used as the light source 1.

Figure 30:
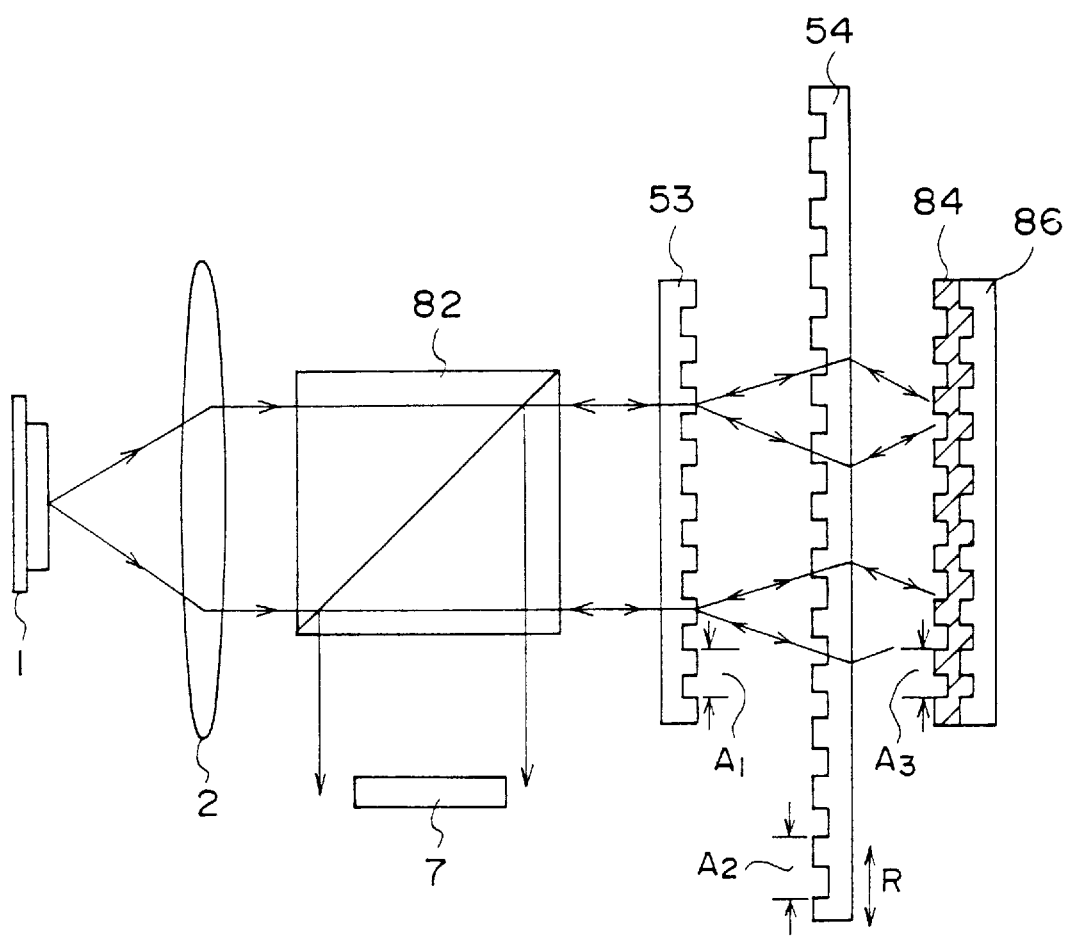
FIG. 30 is an illustration of a variation of the encoder shown in FIG. 28.

FIG. 30 is an illustration a structure of a variation of the encoder shown in FIG. 28. In the encoder shown in FIG. 24, similarly to the encoder of FIG. 27, reflecting means 84 is provided on the movable diffraction grating 86 instead of the reflecting means 81 of FIG. 24. The reflecting means 84 comprises a thin metal film such as aluminum formed by means of vapor deposition, sputtering or the like on the surface of the movable diffraction grating 86. In the present variation, the pitch $A_3$ of the movable diffraction grating 86 is approximately one half of the pitch $A_1$ and $A_2$ of the fixed diffraction gratings 53 and 54.

In the above-mentioned variation, the beam emitted by the light source 1 experiences the fixed diffraction grating 53 twice, the fixed diffraction grating 54 twice and the movable diffraction grating 86 once. The pitch $A_0$ of the interference fringes formed on the light receiving element 7 is represented by the following expression.

$$A_0 = 1/[2(n_1-n_2)/A_1 - (m_1-m_2)/A_2 + (l_1-l_2)/A_3] \quad (43)$$

The expression (43) is obtained as follows. For the sake of convenience of description, it is supposed that the ± first diffraction beams are used as $n_1$, $n_2$, $m_1$, $m_2$, $l_1$ and $l_2$. The expression (42) is transformed as follows.

$$\begin{aligned} A_0 &= 1/[4(1/A_1 - 1/A_2 + 1/A_3)] \\ &= 1/[2(2/A_1 - 2/A_2 + 1/(A_3/2))] \end{aligned} \quad (44)$$

According to the expression (44), the expression (43) can be obtained.

In the above-mentioned variation, when the grating having the pitch $A_1$ or $A_2$ is moved, periods of sine waveform corresponding to two times the order of diffraction at the moving grating is obtained while the grating moves one pitch. When the grating having the pitch $A_3$ is moved, periods of sine waveform corresponding in number to the order of diffraction at the moving grating is obtained while the grating moves by one pitch. Although the number of periods is one half of that of the encoder shown in FIG. 28, the resolution is four times that of the first and second embodiments since the pitch $A_3$ is approximately one half of the pitch $A_1$ or $A_2$.

Additionally, thanks to the reflection means 84, a light emitting diode having a wide light-emitting surface can be used as the light source as previously described.

It should be noted that although three gratings are provided in the fourth embodiment, an encoder having more than three gratings may be formed.

It should be noted that although, in the above-mentioned third and fourth embodiments and variations thereof, the movable diffraction grating 54 or 86 is moved linearly in the direction indicated by the arrow R so as to form a linear encoder, a rotary encoder can also be formed using the principle of the present invention.

Figure 31:
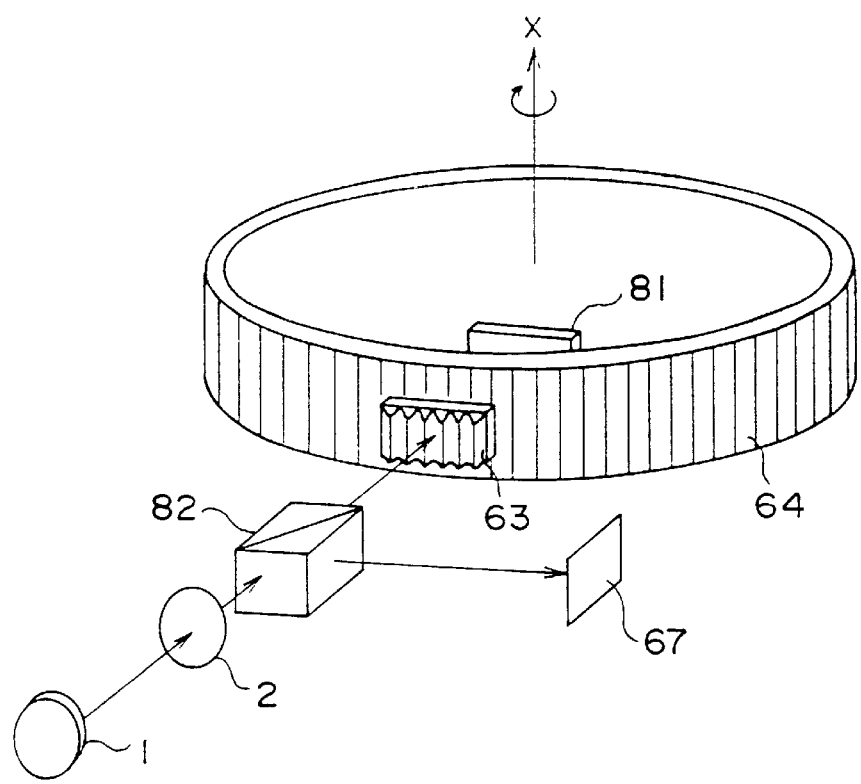
FIG. 31 is an illustration of a rotary encoder according to the present invention.
Figure 32:
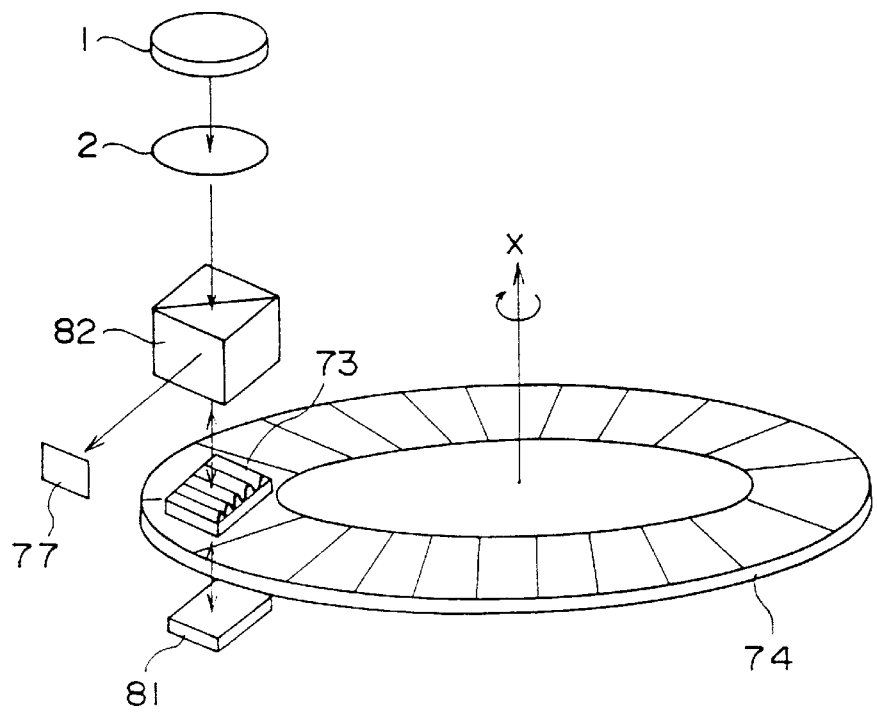
FIG. 32 is an illustration of a rotary encoder according to the present invention.
Figure 33:
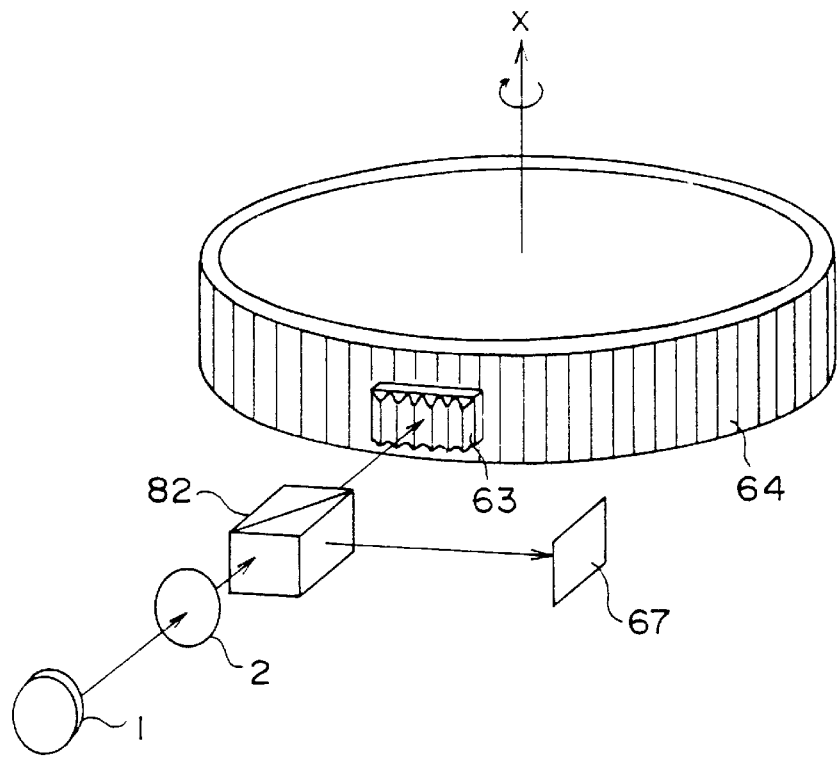
FIG. 33 is an illustration of a rotary encoder according to the present invention.
Figure 34:
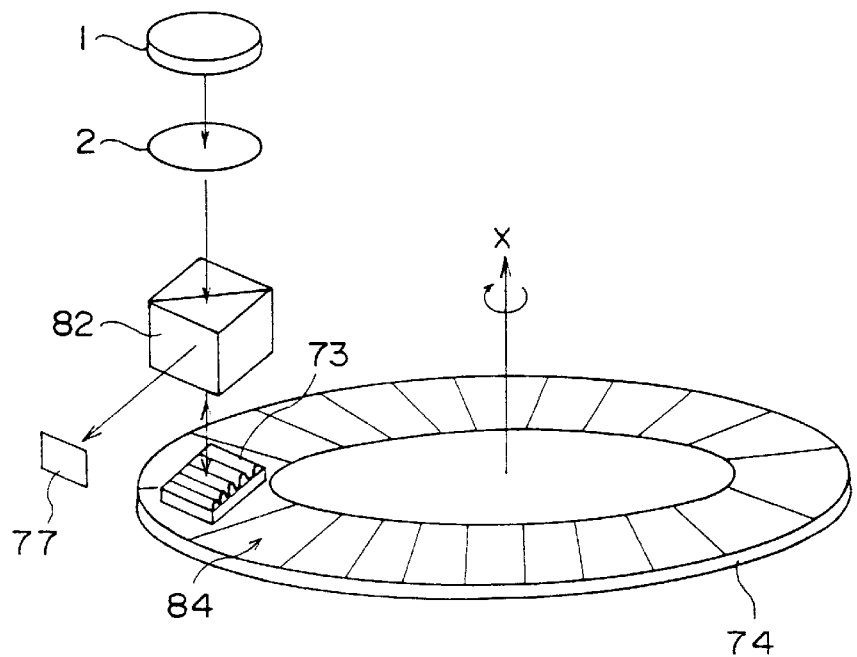
FIG. 34 is an illustration of a rotary encoder according to the present invention.
Figure 36:
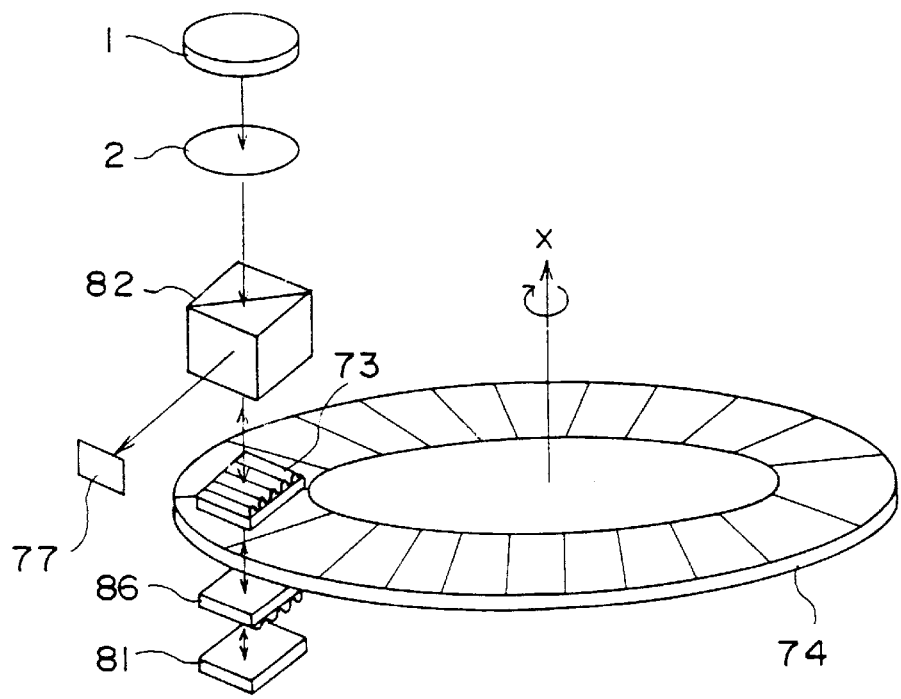
FIG. 36 is an illustration of a rotary encoder according to the present invention.
Figure 37:
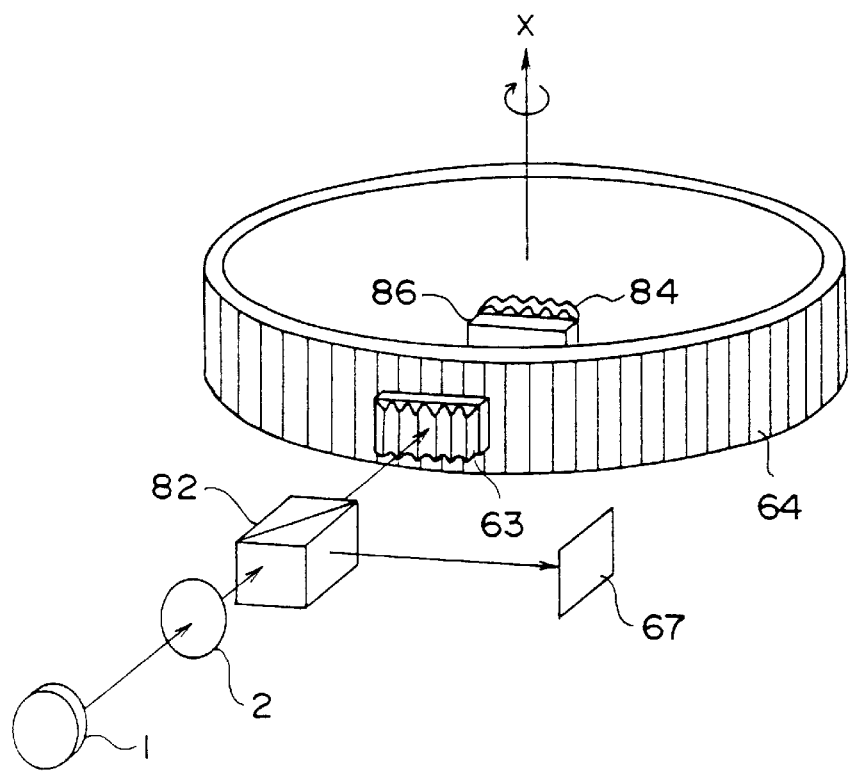
FIG. 37 is an illustration of a rotary encoder according to the present invention.

FIGS. 31 through 38 show examples of a rotary encoder using the principle of the present invention. The rotary encoders shown in FIGS. 31 and 32 are provided with reflecting means 81 on the side of a rotatable diffraction grating 64 or 74 opposite to a fixed diffraction grating 63 or 73, and thus these encoders correspond to the encoder shown in FIG. 24. The rotary encoders shown in FIGS. 33 and 34 are provided with reflecting means integrally formed with the rotatable diffraction grating 64 or 74, and thus these encoders correspond to the encoder shown in FIG. 27. The rotary encoders shown in FIGS. 35 and 36 are provided with a third diffraction grating 86 and reflecting means 81 on the side of a rotatable diffraction grating 64 or 74 opposite to a fixed diffraction grating 63 or 73, and thus these encoders correspond to the encoder shown in FIG. 28. The rotary encoders shown in FIGS. 37 and 38 are provided with the diffraction grating 86 having reflecting means 84 integrally formed with the grating 86 on the side of a rotatable diffraction grating 64 or 74 opposite to a fixed diffraction grating 63 or 73, and thus these encoders correspond to the encoder shown in FIG. 30.

It should be noted that, in the above-mentioned embodiments and variations, it is preferable to select diffraction beams which are as parallel as possible so as to form interference fringes having a large pitch so that the light receiving element can be as large as possible, enabling an easy arrangement of the light receiving element.

When using higher order diffraction beams, there is no wavelength dependency of the type mentioned above, however, the phase of the interference fringes has a wavelength dependency. In order to eliminate this wavelength dependency for the phase, two beams forming the interference fringes should be of the same order of diffraction. Among the orders of diffraction beams, the first diffraction beam provides a preferable result.

For example, in the case of the encoder shown in FIG. 21, if $n_1=1$, $n_2=-1$, $m_1=1$, $m_2=-1$ and $A_1=1$ μm, and in order to have $A_0=2$ mm, $A_2$ should be 1.00025 μm. The difference between $A_1$ and $A_2$ is approximately 0.025%.

In the case of the encoder shown in FIG. 24, if $n_1=1$, $n_2=-1$, $m_1=1$, $m_2=-1$ and $A_1=1$ μm, and in order to have $A_0=2$ mm, $A_2$ should be 1.000125 μm.

In the case of the encoder shown in FIG. 27, if $n_1=1$, $n_2=-1$, $m_1=1$, $m_2=-1$ and $A_1=1$ μm, and in order to have $A_0=2$ mm, $A_2$ should be 0.5000625 μm.

In the case of the encoder shown in FIG. 28, if $n_1=1$, $n_2=-1$, $m_1=1$, $m_2=-1$, $A_1=1$ μm and $A_2=0.5$ μm, and in order to have $A_0=2$ mm, $A_3$ should be 0.999875 μm.

A description will now be given, with reference to FIGS. 39 through 45, of displacement information obtaining means according to the present invention. In the above-mentioned embodiments and variations, the light receiving element outputs a sine waveform signal when the movable diffraction grating is moved. It is preferred that the sine waveform signal has a high aspect ratio (ratio of a peak level and a bottom level: $t_2/t_1$). When the sine waveform signal is formed by a single light-receiving element, the signal cannot have a good quality (that is a high aspect ratio) because the signal has a bias component $t_1$.

In the description below, the displacement information obtaining means is described basically in conjunction with the structure of the encoder shown in FIG. 16.

Figure 39:
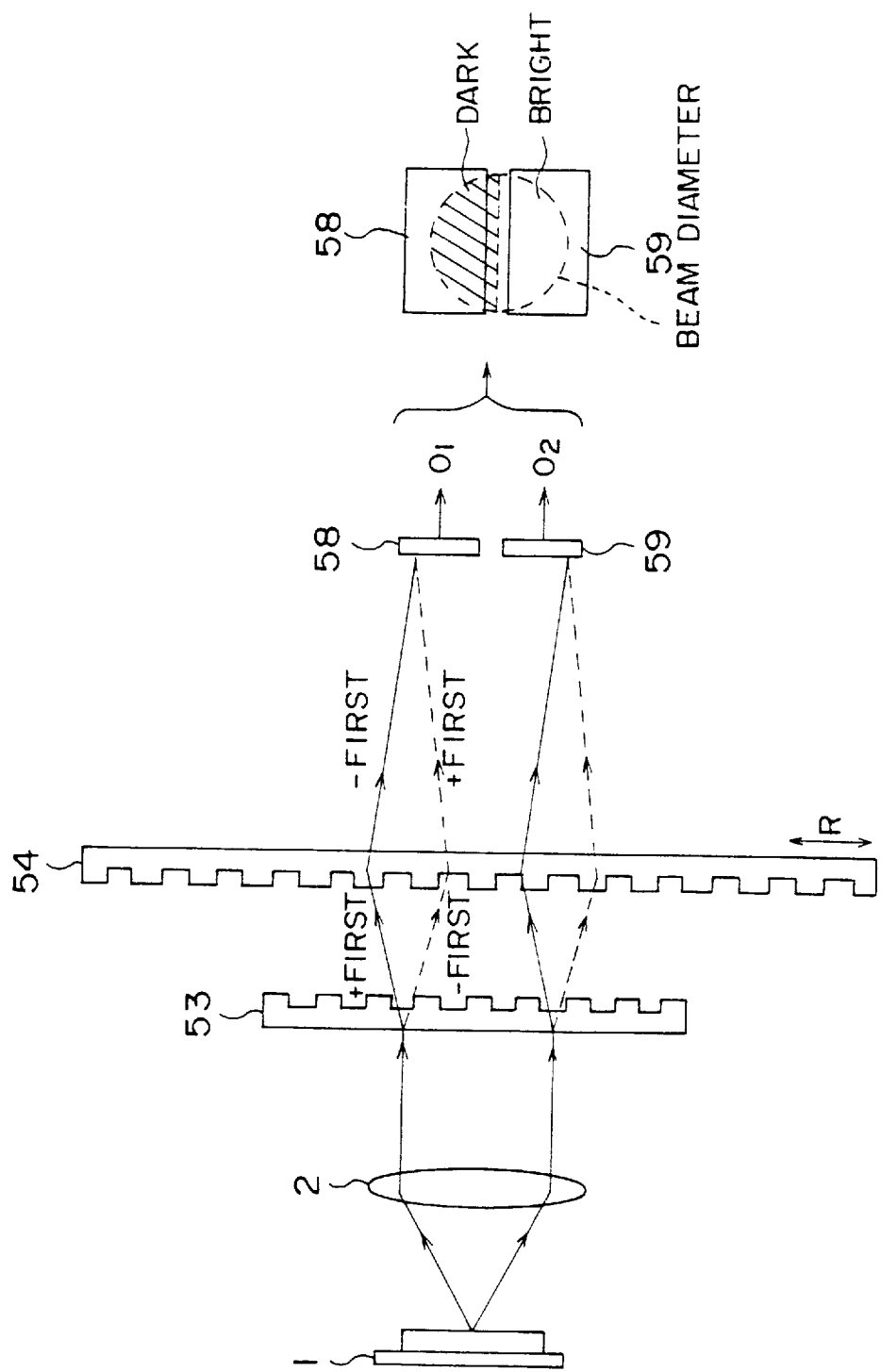
FIG. 39 is an illustration of an encoder in which two light receiving elements are provided apart from each other a distance corresponding to one half of the pitch of interference fringes.

FIG. 39 shows a structure in which two light-receiving elements 58 and 59 are provided to receive the beams forming interference fringes. The light receiving elements 58 and 59 are formed and arranged so that when a dark area and a bright area of the interference fringes are formed within the diameter of the beam received by the light receiving elements, one of the light receiving elements 58 and 59 receives the dark area while the other one receives the bright area. That is, the light receiving elements 58 and 59 are apart from each other by a distance corresponding to one half of the pitch of the interference fringes. A sine waveform signal can be obtained from the difference between the outputs from light receiving elements 58 and 59.

Figure 40:
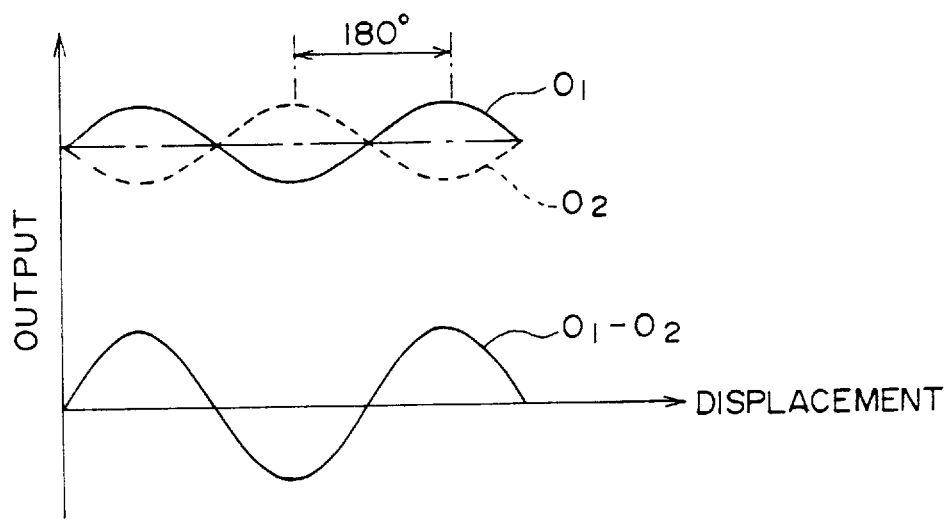
FIG. 40 is a graph showing output signals from the light receiving elements shown in FIG. 39.
Figure 41:
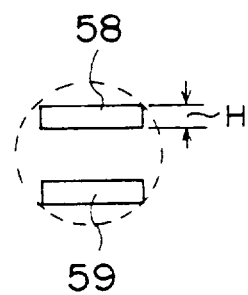
FIG. 41 is an illustration of the light receiving elements having a smaller width.

FIG. 40 shows the relationship between the outputs 01 and 02 from the light receiving elements 58 and 59 and the sine waveform signal (01–02) obtained according to the difference between the outputs 01 and 02. As can be seen in FIG. 40, the outputs 01 and 02 have phases shifted by 180° from each other. Accordingly, by taking the difference between the outputs 01 and 02, a bias component can be eliminated, and thus a sine waveform signal (01–02) having a high aspect ratio is obtained. Additionally, in this case, as shown in FIG. 41, if the width H of each-of the light receiving elements 58 and 59 is smaller than one half of the pitch of the interference fringes, a more complete sine waveform signal may be obtained. However, since the amount of received light is decreased as the width H is decreased, an appropriate design should be performed depending on applications thereof.

Figure 42:
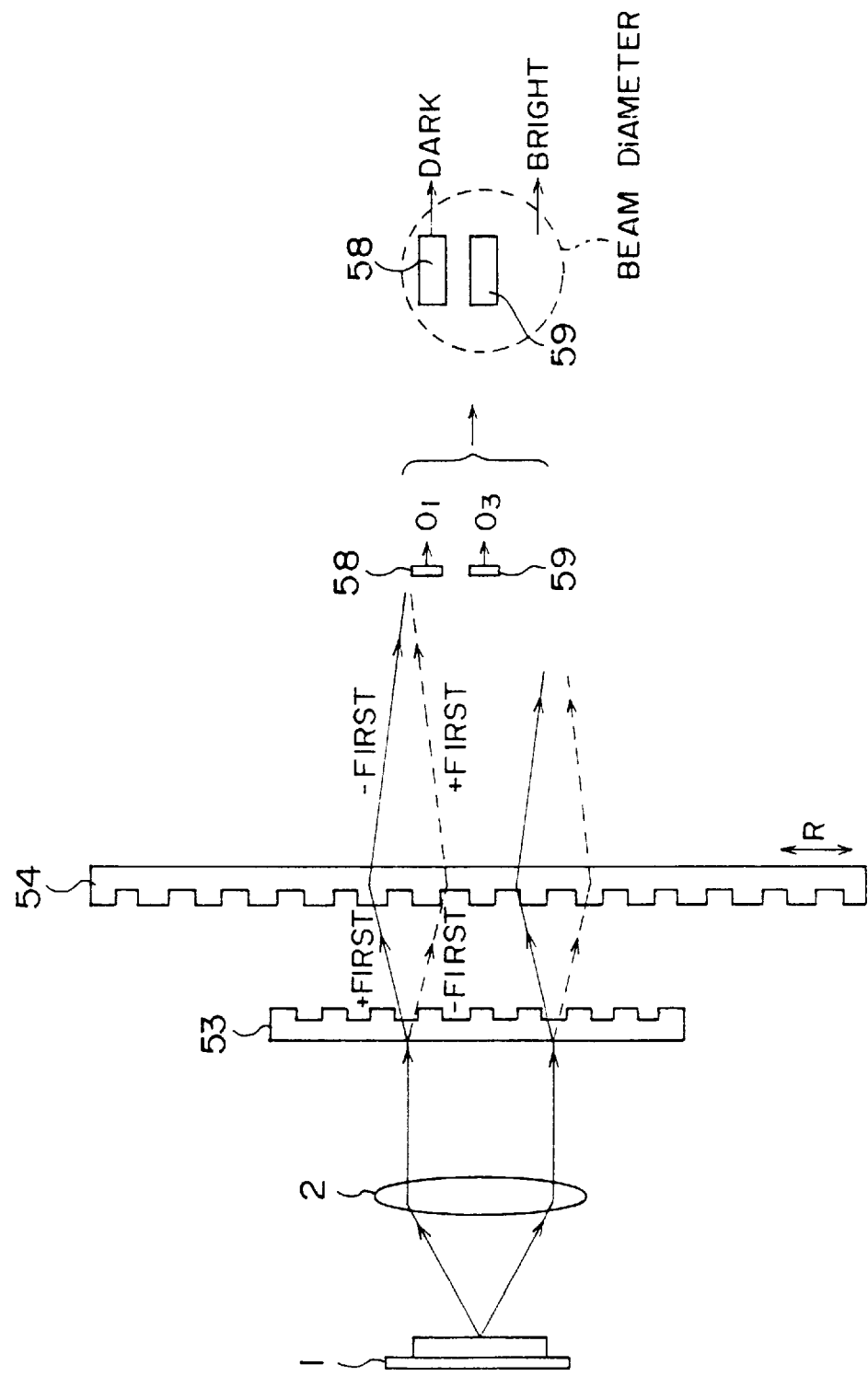
FIG. 42 is an illustration of an encoder in which two light receiving elements are provided apart from each other a distance corresponding to one quarter of the pitch of interference fringes.
Figure 43:
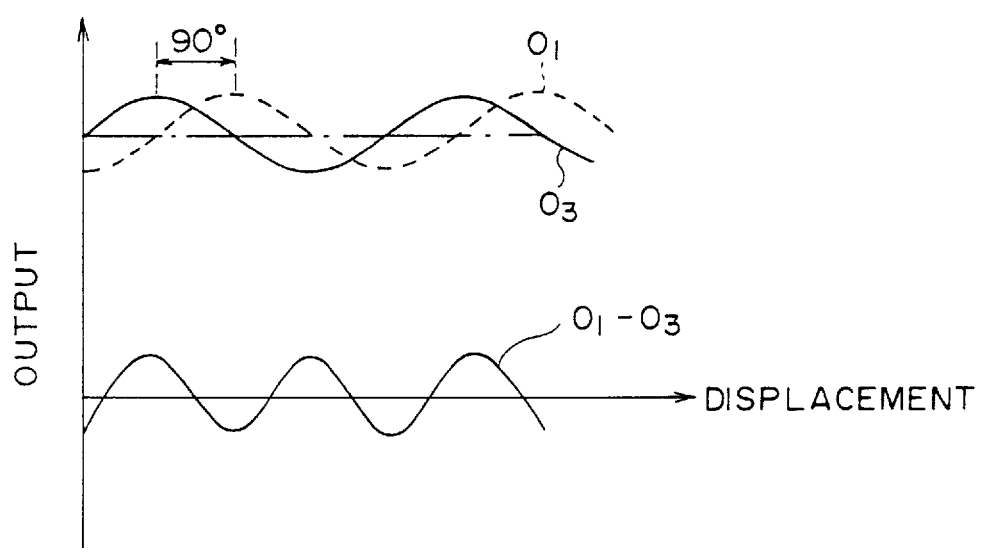
FIG. 43 is a graph showing output signals from the light receiving elements shown in FIG. 42.

The light receiving elements 58 and 59 may be arranged, as shown in FIG. 42, so that the elements 58 and 59 are apart a distance corresponding to one quarter of the pitch of the interference fringes. FIG. 43 shows a relationship among the outputs 01 and 03 from the light receiving elements 58 and 59 and the sine waveform signal (01–03) obtained according to the difference between the outputs 01 and 03. As can be seen in FIG. 43, the outputs 01 and 03 have phases shifted by 90° from each other. These outputs 01 and 03 correspond to the A-phase signal and B-phase signal used in a typical encoder, respectively. Accordingly, by taking a difference between the outputs 01 and 03, a bias component can be eliminated, and thus a complete sine waveform signal (01–03) having a high aspect ratio is obtained. Additionally, in this case, as generally performed in conventional encoders, the output 01 (A-phase signal) and the output 03 (B-phase signal) can be used for determining moving direction of the movable diffraction grating.

Figure 44:
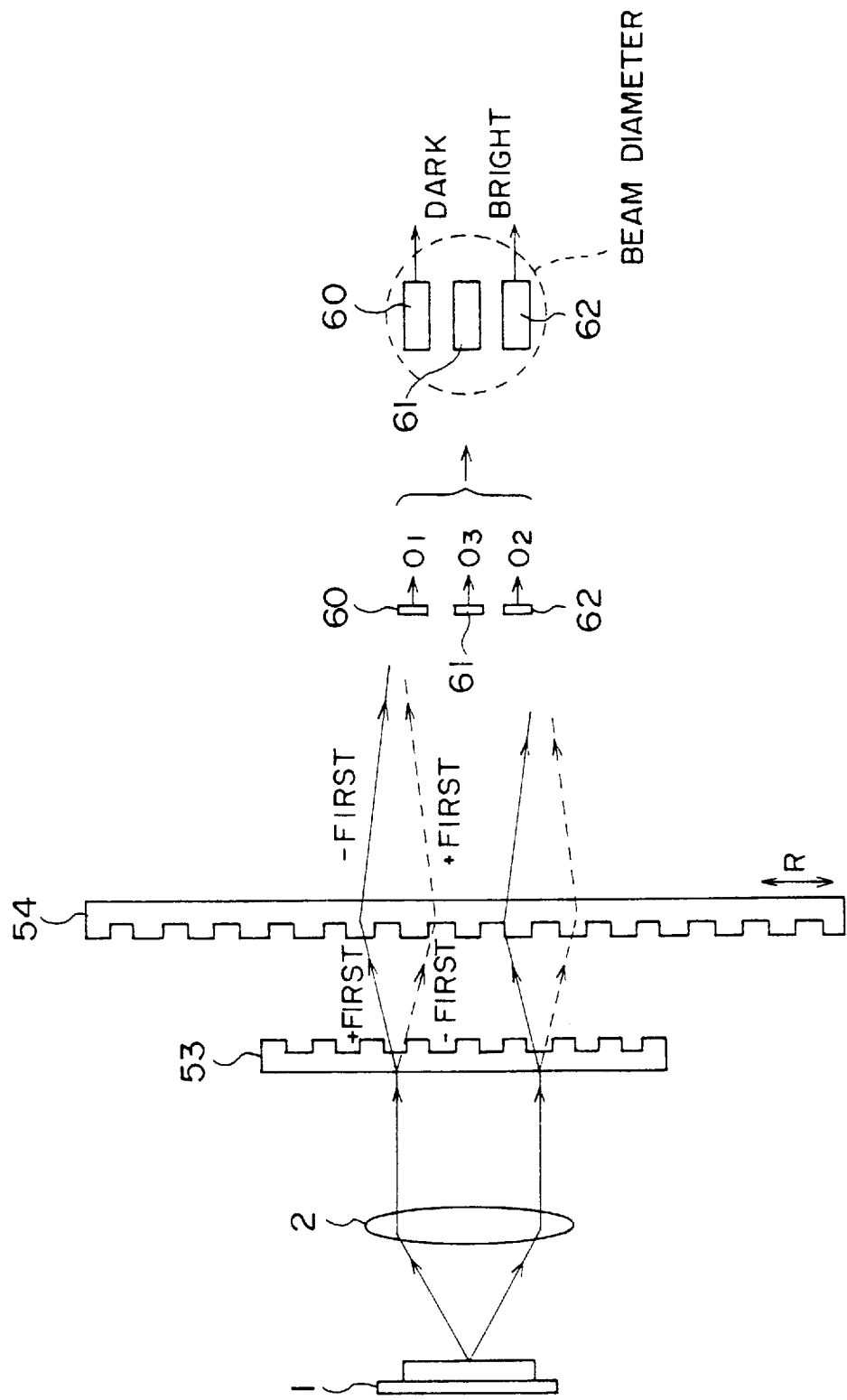
FIG. 44 is an illustration of an encoder in which three light receiving elements are provided apart from each other a distance corresponding to one quarter of the pitch of interference fringes.

In order to obtain a further improved signal having a high aspect ratio, three light-receiving elements 60, 61 and 62 may be provided, as shown in FIG. 44, so that the three elements are apart from each other a distance corresponding to one quarter of the pitch of the interference fringes. FIG. 45 shows the relationship between the outputs 01, 02 and 03 from the light receiving elements 60, 61 and 62 and the sine waveform signals (01–03) and (03–02) obtained according to the difference between the outputs 01 and 03 and the difference between the outputs 03 and 02. As can be seen in FIG. 45, the outputs 01, 02 and 03 have phases shifted by 90° from each other. The sine waveform signals (01–03) and (03–02) correspond to the A-phase signal and B-phase signal used in a typical encoder, respectively. Accordingly, complete sine waveform signals (01–03) and (03–02) having a high aspect ratio are obtained, which signals are used for determining the moving direction of the movable diffraction grating.

Figure 46A:
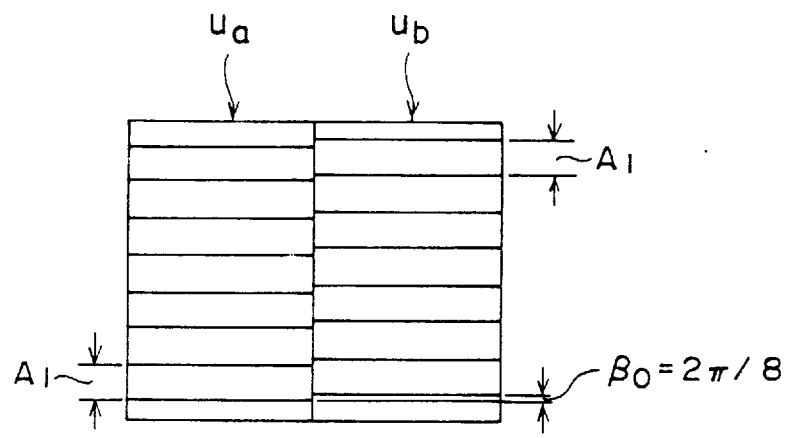
FIG. 46A is an illustration of a grating comprising two series of grids having a phase shift.

Additionally, in the encoders described above, at least one of the gratings 53, 54 and 86 may be formed, as shown in FIG. 46A, so that the grating comprises two areas $u_a$ and $u_b$ having lines shifted in phase. That is, the pitches of the lines of the areas $u_a$ and $u_b$ are the same but the phase of the lines of the area $u_a$ is shifted by $\beta_0$ from that of the area $u_b$. According to the above configuration of the grating, two kinds of interference fringes $I_a$ and $I_b$ having the same pitch with shifted phase are obtained. Accordingly, two different output signals are obtained by arranging two light-receiving elements 7a and 7b to correspond to the interference fringes $I_a$ and $I_b$. The width of each of the light-receiving elements is less than the width of the areas $u_a$ and $u_b$. Additionally, the phase shift $\beta_0$ is preferably $2\pi/(4|m_1-m_2|)$ or $2\pi/(4|n_1-n_2|)$, where $n_1$ and $n_2$ and $m_1$ and $m_2$ are the orders of diffraction at the areas $u_a$ and $u_b$, respectively.

Supposing the second grating 54 has those areas, $u_a$ and $u_b$, and the ± first diffraction beams generated at the first diffraction grating 53 are used, and the ± first diffraction beams generated at the second diffraction grating 54 are used, the phase shift $\beta_0$ is preferably set to $2\pi/8$. In such a case where the ± first diffraction beams of the second diffraction grating 54 are used, a phase shift $\beta_1$ of the interference fringes $I_a$ and $I_b$ is twice the phase shift $\beta_0$ $$\beta_1=2\beta_0 \tag{45}$$

When $\beta_0$ is set to $2\pi/8$, the phase shift between the interference fringes $I_a$ and $I_b$ is $2\pi/4$, and thus two different sine waveform signals (corresponding to the A-phase signal and B-phase signal) having phases shifted 90° from each other are obtained. Accordingly, as previously described, moving direction information as well as displacement information can be obtained using the outputs of the light receiving elements 7a and 7b.

It should be noted that, in the encoder shown in FIG. 42, the A-phase signal and the B-phase signal are obtained from a single series of interference fringes. Accordingly, if there is an offset or an inclination of the interference fringes, phases of the A-phase signal and the B-phase signal tend to be shifted, and thus a detection error may easily occur. On the other hand, in the case where the A-phase signal and the B-phase signal are obtained from two interference fringes as described with reference to FIGS. 46A and 46B, the detection error due to an inclination of the interference fringes can be reduced.

Figure 47:
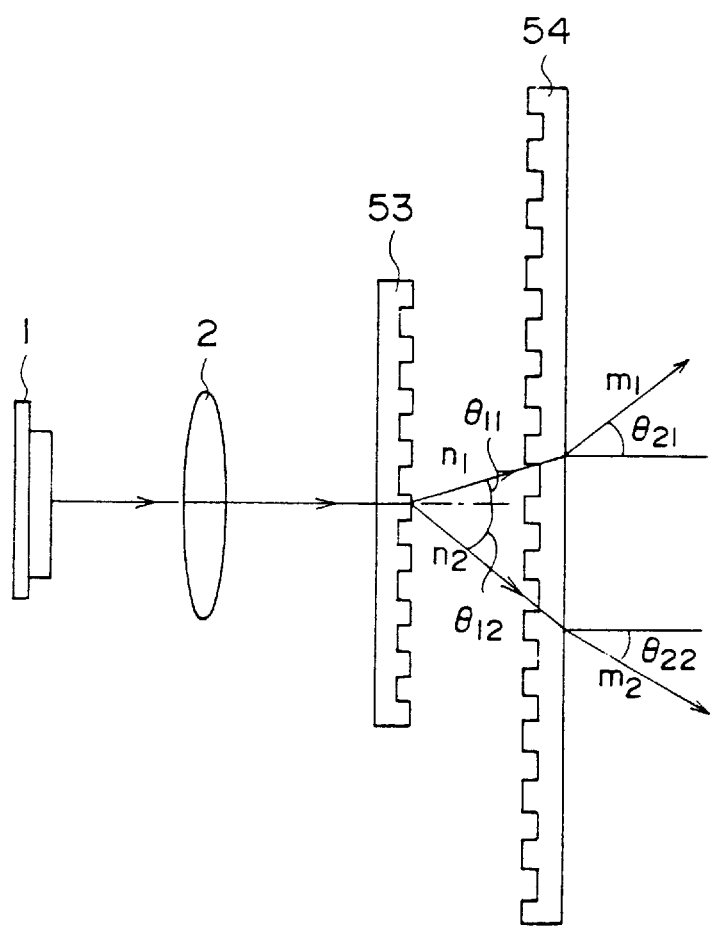
FIG. 47 is an illustration of an encoder in which higher order diffraction beams are used.

In this case, higher order diffraction beams may be used, as in the encoder shown in FIG. 47, than using the first diffraction beams. In the case shown in FIG. 47, the diffraction condition at the first diffraction grating 53 is represented as follows.

$$\sin \theta_{11} = n_1 \lambda / A_1 \quad (46a)$$

$$\sin \theta_{12} = n_2 \lambda / A_1 \quad (46b)$$

The diffraction condition at the second diffraction grating is represented as follows.

$$-\sin \theta_{21} + \sin \theta_{11} = m_1 \lambda / A_2 \quad (47a)$$

$$-\sin \theta_{22} + \sin \theta_{12} = m_2 \lambda / A_2 \quad (47b)$$

According to the expressions (46a), (46b), (47a) and (47b), the following expression can be obtained.

$$\sin \theta_{21} = \lambda (m_1/A_2 - n_1/A_1) \quad (48a)$$

$$\sin \theta_{22} = \lambda (m_2/A_2 - n_2/A_1) \quad (48b)$$

Additionally, the pitch $A_0$ of the interference fringes formed by the beams having the angles $\theta_{21}$ and $\theta_{22}$ is represented by the following expression.

$$A_0 = \lambda / (\sin \theta_{21} + \sin \theta_{22}) \quad (49)$$

Using the expressions (48) and (49), the following relationship is obtained among $A_1$, $A_2$ and $A_0$.

$$A_0 = 1/[(m_1+m_2)/A_2 - (n_1+n_2)/A_1] \quad (50)$$

It is understood from the expression (50) that in the present case, the pitch $A_0$ of the interference fringes is related, similarly to the previously described embodiment, only to the pitch $A_1$ of the first diffraction grating 53 and the pitch $A_2$ of the second diffraction grating 54. Therefore, the interference fringes are not affected by a fluctuation of the wavelength of the light beam emitted by the light source 1, and thus a semiconductor laser having a relatively long wavelength can be used as the light source 1.

It should be noted that in order to obtain generally parallel beams exiting from the second diffraction grating 54, in a condition where $A_1 = A_0$ for example, the previously described relationship (30) must be satisfied.

Additionally, in the case where the $m_1$th diffraction beam and the $m_2$th diffraction beam at the second grating 54 are used, the phase shift between the interference fringes is $(m_1-m_2)$ times the phase shift of the second diffraction grating 54, and thus the following expression is obtained.

$$\beta_1 = (m_1-m_2)\beta_0 \quad (51)$$

If $\beta_1 = \pi/2$, $\beta_0 = \pi/[2(m_1-m_2)]$

Figure 46B:
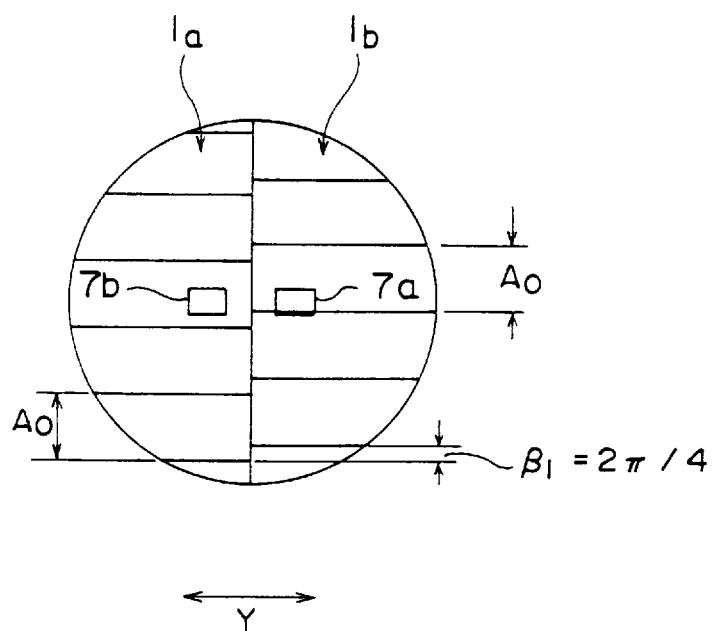
FIG. 46B is an illustration of interference fringes formed using the grating shown in FIG. 46A.
Figure 48:
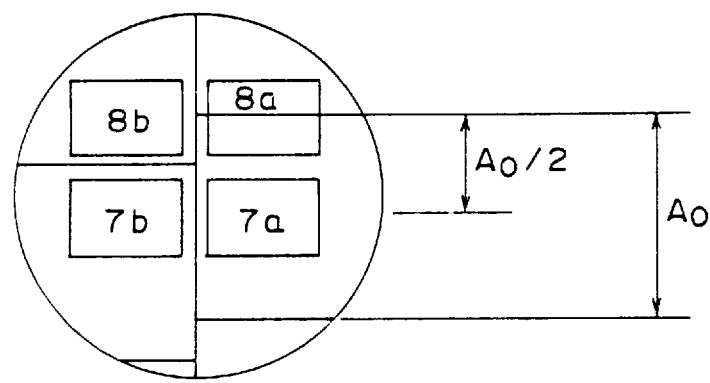
FIG. 48 is an illustration of light receiving elements of an encoder in which four light-receiving elements are provided.

In the encoder shown in FIGS. 46A and 46B, the sine waveform signals output from the light receiving elements 7a and 7b have a bias component $t_1$, and thus detection error may occur due to a low aspect ratio. In order to eliminate this problem the configuration of the light receiving elements described with reference to Fig.39 and FIG. 42 may be applied, as shown in FIG. 48, to the configuration of the light receiving elements shown in FIG. 46B.

Figure 49:
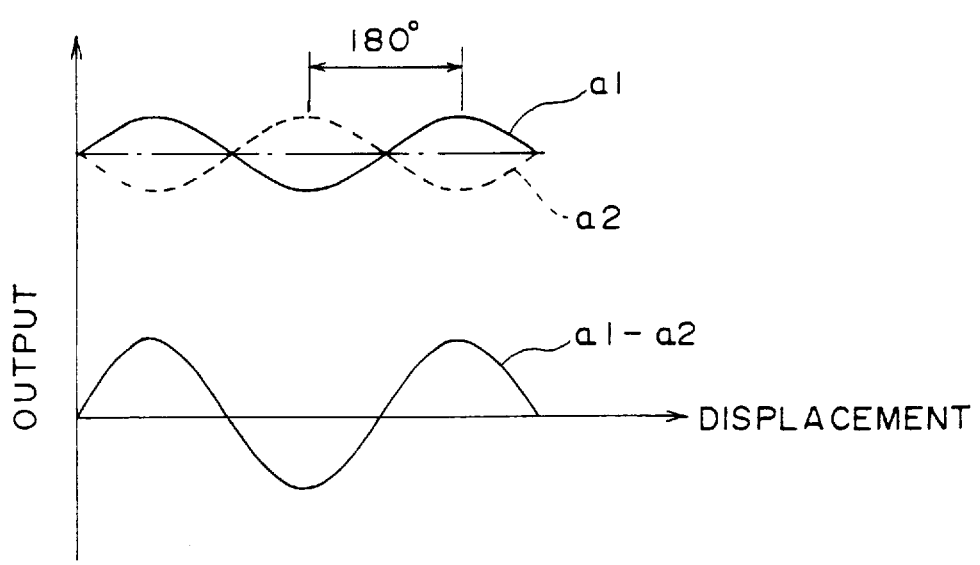
FIG. 49 is a graph showing output signals from two of the light receiving elements shown in FIG. 48.
Figure 50:
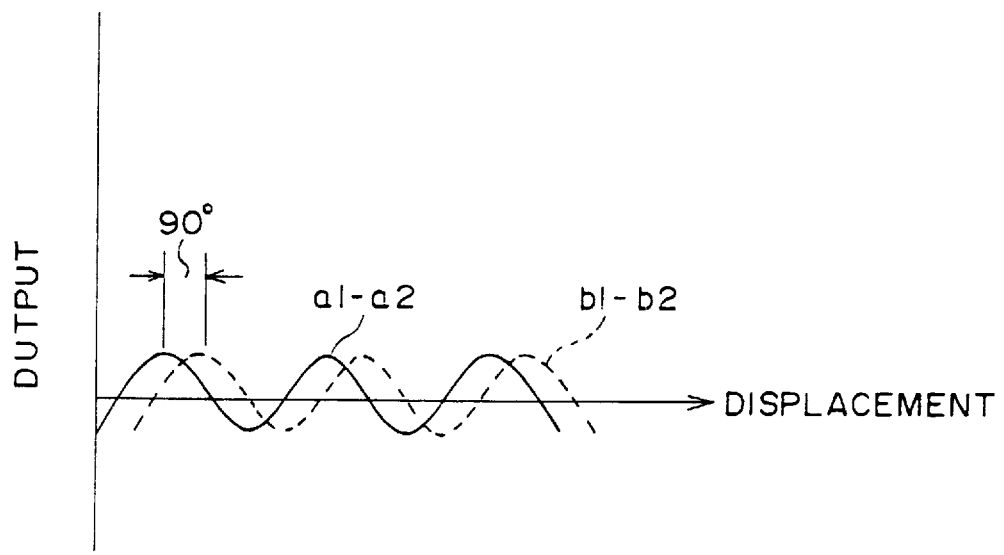
FIG. 50 is a graph showing output signals from the encoder of FIG. 48.
Figure 51:
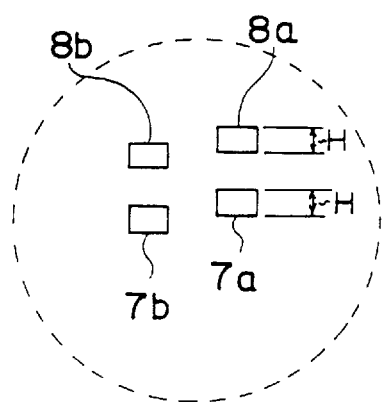
FIG. 51 is an illustration of the light receiving elements shown in FIG. 48 having a smaller width.

FIG. 49 shows a relationship among the outputs $a_1$ and $a_2$ from the light receiving elements 7a and 8a and a difference $(a_1-a_2)$. FIG. 49 corresponds to FIG. 40, and thus the advantages described with reference to FIG. 40 can be applied to the encoder having the configuration shown in FIG. 48. Outputs $b_1$ and $b_2$ from the light receiving elements 8a and 8b and the difference $(b_1-b_2)$ are the same as that shown in FIG. 49. The relationship between the difference $(a_1-a_2)$ and $(b_1-b_2)$ is shown in FIG. 50. According to the present case, an improved A-phase signal and B-phase signal having a 90°-phase shift from each other are obtained, and thus moving direction information and displacement information can be obtained with high accuracy. Additionally, as described with reference to FIG. 41, widths H of the light receiving elements 7a, 8a, 7b and 8b may be reduced so as to obtain further reduced bias component.

It should be noted that, in the above-mentioned embodiments and variations thereof having two diffraction gratings, either one of the gratings may be a movable diffraction grating while the other grating is made to be a fixed diffraction grating. Similarly, in the above-mentioned embodiments and variations thereof having three diffraction gratings, any one of the gratings may be a movable diffraction grating while the other gratings are made to be fixed diffraction gratings.

Additionally, the present invention can be applied in a case where the light beam emitted by the light source 1 is incident on the first diffraction grating from a direction not perpendicular to the surface of the grating.

The present invention is not limited to the specifically disclosed embodiments, and variations and modifications may be made without departing from the scope of the present invention.

What is claimed is:

1. An optical encoder comprising:

a light source emitting a light beam;

a first grating to which said light beam emitted by said light source is directed, an $n_1$th order and an $n_2$th order diffraction beam being generated at said first grating, where $n_1$ and $n_2$ are integers, said $n_1$th order diffraction beam being directed to the opposite side, relative to said $n_2$th order diffraction beam, of the optical axis of said light beam emitted by said light source;

a second grating to which said $n_1$th order and said $n_2$th order diffraction beams exiting from said first grating are directed, an $m_1$th order and an $m_2$th order diffraction beam being generated from said $n_1$th order and said $n_2$th order diffraction beams at said second grating, where $m_1$ and $m_2$ are integers; and displacement information obtaining means for obtaining information on a displacement of one of said first and second gratings, said information being obtained according to a movement of interference fringes formed by said $m_1$th order and said $m_2$th order diffraction beams exiting from said second grating, wherein said second grating comprises a transmission type grating.

2. The optical encoder as claimed in claim 1, further comprising reflecting means for reflecting said $m_1$th order and said $m_2$th order diffraction beams so that said $m_1$th order and said $m_2$th order diffraction beams return to said first grating by traveling the same paths and diffracted at said first grating twice and said second grating twice, and wherein said displacement information obtaining means obtaining said information in accordance with said $m_1$th order and said $m_2$th order diffraction beams returned to and exited from said first diffraction grating.

3. The optical encoder as claimed in claim 2, wherein said reflecting means comprises a mirror arranged behind said second grating.

4. The optical encoder as claimed in claim 1, further comprising reflecting means for reflecting said $m_1$th order and said $m_2$th order diffraction beams so that said $m_1$th order and said $m_2$th order diffraction beams return to said first grating by traveling the same paths and diffracted at said first grating twice and said second grating once, and wherein said displacement information obtaining means obtaining said information in accordance with said $m_1$th order and said $m_2$th order diffraction beams returned to and exited from said first diffraction grating.

5. The optical encoder as claimed in claim 4, wherein said reflecting means comprises a reflecting material formed on said second grating.

6. The optical encoder as claimed in claim 1, wherein one of said first and second gratings comprises a first area having first lines and a second area having second lines, said first lines being spatially shifted relative to said second lines by a first predetermined value so that said first area forms first interference fringes spatially shifted by a second predetermined value relative to second interference fringes formed by said second area, and said displacement information obtaining means comprises four light-receiving elements so that signals having different phases are obtained in order to obtain said information including displacement and moving direction.

7. The optical encoder as claimed in claim 6, wherein when said first grating has said first and second areas, and when the $n_1$th order diffraction beam is used at said first area and the $n_2$th order diffraction beam is used at said second area, said first predetermined value is equal to $2\pi/(4|n_1-n_2|)$.

8. The optical encoder as claimed in claim 6, wherein when said second grating has said first and second areas, and when the $m_1$th order diffraction beam is used at said first area and the $m_2$th order diffraction beam is used at said second area, said first predetermined value is equal to $2\pi/(4|m_1-m_2|)$.

9. The optical encoder as claimed in claim 6, wherein a first interference fringe area is formed according to said first area, and a second interference fringe area is formed according to said second area, two of said four light-receiving elements being arranged in said first interference fringe area in a direction perpendicular to a direction of extent of the first interference fringe, and the other two of said four light-receiving elements being arranged in said second interference fringe area in a direction perpendicular to the second interference fringe.

10. An optical encoder comprising:

a light source emitting a light beam;

first grating to which said light beam emitted by said light source is directed, an $n_1$th order and an $n_2$th order diffraction beam being generated at said first grating, where $n_1$ and $n_2$ are integers, said $n_1$th order diffraction beam being directed to the opposite side, relative to said $n_2$th order diffraction beam, of the optical axis of said light beam emitted by said light source;

a second grating to which said $n_1$th order and said $n_2$th order diffraction beams exiting from said first grating are directed, an $m_1$th order and an $m_2$th order diffraction beam being generated from said $n_1$th order and said $n_2$th order diffraction beams at said second grating, where $m_1$ and $m_2$ are integers;

displacement information obtaining means for obtaining information on a displacement of one of said first and second gratings, said information being obtained according to a movement of interference fringes formed by said $m_1$th order and said $m_2$th order diffraction beams exiting from said second grating; and reflecting means for reflecting said $m_1$th order and said $m_2$th order diffraction beams so that said $m_1$th order and said $m_2$th order diffraction beams return to said first grating by traveling the same paths and diffracted at said first grating twice and said second grating twice, and wherein said displacement information obtaining means obtaining said information in accordance with said $m_1$th order and said $m_2$th order diffraction beams returned to and exited from said first diffraction grating.

11. An optical encoder comprising:

a light source emitting a light beam;

a first grating to which said light beam emitted by said light source is directed, an $n_1$th order and an $n_2$th order diffraction beam being generated at said first grating, where $n_1$ and $n_2$ are integers, said $n_1$th order diffraction beam being directed to the opposite side, relative to said $n_2$th order diffraction beam, of the optical axis of said light beam emitted by said light source;

a second grating to which said $n_1$th order and said $n_2$th order diffraction beams exiting from said first grating are directed, an $m_1$th order and an $m_2$th order diffraction beam being generated from said $n_1$th order and said $n_2$th order diffraction beams at said second grating, where $m_1$ and $m_2$ are integers;

displacement information obtaining means for obtaining information on a displacement of one of said first and second gratings, said information being obtained according to a movement of interference fringes formed by said $m_1$th order and said $m_2$th order diffraction beams exiting from said second grating; and reflecting means for reflecting said $m_1$th order and said $m_2$th order diffraction beams so that said $m_1$th order and said $m_2$th order diffraction beams return to said first grating by traveling the same paths and diffracted at said first grating twice and said second grating twice, and wherein said displacement information obtaining means obtaining said information in accordance with said $m_1$th order and said $m_2$th order diffraction beams returned to and exited from said first diffraction grating, wherein said reflecting means comprises a mirror arranged behind said second grating.

12. An optical encoder comprising:

a light source emitting a light beam;

a first grating to which said light beam emitted by said light source is directed, an $n_1$th order and an $n_2$th order diffraction beam being generated at said first grating, where $n_1$ and $n_2$ are integers, said $n_1$th order diffraction beam being directed to the opposite side, relative to said $n_2$th order diffraction beam, of the optical axis of said light beam emitted by said light source;

a second grating to which said $n_1$th order and said $n_2$th order diffraction beams exiting from said first grating are directed, an $m_1$th order and an $m_2$th order diffraction beam being generated from said $n_1$th order and said $n_2$th order diffraction beams at said second grating, where $m_1$ and $m_2$ are integers; and displacement information obtaining means for obtaining information on a displacement of one of said first and second gratings, said information being obtained according to a movement of interference fringes formed by said $m_1$th order and said $m_2$th order diffraction beams exiting from said second grating, wherein one of said first and second gratings comprises a first area having first lines and a second area having second lines, said first lines being spatially shifted relative to said second lines by a first predetermined value so that said first area forms first interference fringes spatially shifted by a second predetermined value relative to second interference fringes formed by said second area, and said displacement information obtaining means comprises four light-receiving elements so that signals having different phases are obtained in order to obtain said information including displacement and moving direction.

13. An optical encoder comprising:

a light source emitting a light beam;

a first grating to which said light beam emitted by said light source is directed, an $n_1$th order and an $n_2$th order diffraction beam being generated at said first grating, where $n_1$ and $n_2$ are integers, said $n_1$th order diffraction beam being directed to the opposite side, relative to said $n_2$th order diffraction beam, of the optical axis of said light beam emitted by said light source;

a second grating to which said $n_1$th order and said $n_2$th order diffraction beams exiting from said first grating are directed, an $m_1$th order and an $m_2$th order diffraction beam being generated from said $n_1$th order and said $n_2$th order diffraction beams at said second grating, where $m_1$ and $m_2$ are integers; and displacement information obtaining means for obtaining information on a displacement of one of said first and second gratings, said information being obtained according to a movement of interference fringes formed by said $m_1$th order and said $m_2$th order diffraction beams exiting from said second grating, wherein one of said first and second gratings comprises a first area having first lines and a second area having second lines, said first lines being shifted relative to said second lines by a first predetermined value so that said first area forms first interference fringes shifted by a second predetermined value relative to second interference fringes formed by said second area, said displacement information obtaining means comprises four light-receiving elements so that signals having different phases are obtained in order to obtain said information including displacement and moving direction, and when said first grating has said first and second areas and when the $n_1$th order diffraction beam is used at said first area and the $n_2$th order diffraction beam is used at said second area, said first predetermined value is equal to $2\pi/(4|n_1-n_2|)$.

14. An optical encoder comprising:

a light source emitting a light beam;

a first grating to which said light beam emitted by said light source is directed, an $n_1$th order and an $n_2$th order diffraction beam being generated at said first grating, where $n_1$ and $n_2$ are integers, said $n_1$th order diffraction beam being directed to the opposite side, relative to said $n_2$th order diffraction beam, of the optical axis of said light beam emitted by said light source;

a second grating to which said $n_1$th order and said $n_2$th order diffraction beams exiting from said first grating are directed, an $m_1$th order and an $m_2$th order diffraction beam being generated from said $n_1$th order and said $n_2$th order diffraction beams at said second grating, where $m_1$ and $m_2$ are integers; and displacement information obtaining means for obtaining information on a displacement of one of said first and second gratings, said information being obtained according to a movement of interference fringes formed by said $m_1$th order and said $m_2$th order diffraction beams exiting from said second grating, wherein one of said first and second gratings comprises a first area having first lines and a second area having second lines, said first lines being shifted relative to said second lines by a first predetermined value so that said first area forms first interference fringes shifted by a second predetermined value relative to second interference fringes formed by said second area, said displacement information obtaining means comprises four light-receiving elements so that signals having different phases are obtained in order to obtain said information including displacement and moving direction, and when said second grating has said first and second areas and when the $m_1$th order diffraction beam is used at said first area and the $m_2$th order diffraction beam is used at said second area, said first predetermined value is equal to $2\pi/(4|m_1-m_2|)$.

15. An optical encoder comprising:

a light source emitting a light beam;

a first grating to which said light beam emitted by said light source is directed, an $n_1$th order and an $n_2$th order diffraction beam being generated at said first grating, where $n_1$ and $n_2$ are integers, said $n_1$th order diffraction beam being directed to the opposite side, relative to said $n_2$th order diffraction beam, of the optical axis of said light beam emitted by said light source;

a second grating to which said $n_1$th order and said $n_2$th order diffraction beams exiting from said first grating are directed, an $m_1$th order and an $m_2$th order diffraction beam being generated from said $n_1$th order and said $n_2$th order diffraction beams at said second grating, where $m_1$ and $m_2$ are integers; and displacement information obtaining means for obtaining information on a displacement of one of said first and second gratings, said information being obtained according to a movement of interference fringes formed by said $m_1$th order and said $m_2$th order diffraction beams exiting from said second grating, wherein one of said first and second gratings comprises a first area having first lines and a second area having second lines, said first lines being shifted relative to said second lines by a first predetermined value so that said first area forms first interference fringes shifted by a second predetermined value relative to second interference fringes formed by said second area, said displacement information obtaining means comprises four light-receiving elements so that signals having different phases are obtained in order to obtain said information including displacement and moving direction, a first interference fringe area is formed according to said first area, a second interference fringe area is formed according to said second area, two of said four light-receiving elements being arranged in said first interference fringe area in a direction perpendicular to a direction of extent of the first interference fringe, and the other two of said four light-receiving elements being arranged in said second interference fringe area in a direction perpendicular to the second interference fringe.

* * * * *